(12) United States Patent
Momose

(10) Patent No.: US 12,167,179 B2
(45) Date of Patent: *Dec. 10, 2024

(54) PROJECTION DEVICE AND METHOD OF CONTROLLING PROJECTION DEVICE

(71) Applicant: SEIKO EPSON CORPORATION, Tokyo (JP)

(72) Inventor: Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 18/183,209

(22) Filed: Mar. 14, 2023

(65) Prior Publication Data

US 2023/0300304 A1    Sep. 21, 2023

(30) Foreign Application Priority Data

Mar. 15, 2022    (JP) ................. 2022-039992

(51) Int. Cl.
*H04N 9/31*    (2006.01)

(52) U.S. Cl.
CPC ........... *H04N 9/3179* (2013.01); *H04N 9/312* (2013.01)

(58) Field of Classification Search
CPC ...... H04N 9/3179; H04N 9/312; H04N 9/317; H04N 9/3173; H04N 9/3138; H04N 9/3188; G09G 3/001; G09G 3/007; G09G 2340/0407; G03B 21/142
See application file for complete search history.

(56) References Cited

U.S. PATENT DOCUMENTS

| 6,678,000 | B1 * | 1/2004 | Sakata ................. H04N 25/134 348/E9.01 |
| 10,991,286 | B2 | 4/2021 | Hosaka |
| 11,749,183 | B2 | 9/2023 | Momose |
| 11,749,199 | B1 | 9/2023 | Pu et al. |
| 12,002,427 | B2 * | 6/2024 | Momose ................ G09G 3/002 |
| 2005/0025388 | A1 | 2/2005 | Damera-Venkata et al. |
| 2010/0309329 | A1 * | 12/2010 | Hiramoto ............... H04N 25/48 348/222.1 |
| 2012/0293479 | A1 | 11/2012 | Han |
| 2012/0299883 | A1 | 11/2012 | Sumida et al. |
| 2015/0138253 | A1 | 5/2015 | Kimura et al. |
| 2020/0098295 | A1 * | 3/2020 | Hosaka ................ G09G 3/2022 |
| 2020/0120316 | A1 * | 4/2020 | Nakagoshi ............. G09G 5/005 |
| 2020/0327835 | A1 | 10/2020 | Kawashima et al. |

(Continued)

FOREIGN PATENT DOCUMENTS

| JP | 2007-500868 A | 1/2007 |
| JP | 2011-158589 A | 8/2011 |
| JP | 2017-203991 A | 11/2017 |

*Primary Examiner* — Antonio Xavier
(74) *Attorney, Agent, or Firm* — Oliff PLC

(57) ABSTRACT

A projection device includes a display panel including a plurality of OLEDs that emit light in a predetermined direction, and an optical path shift element that shifts an optical path of light emitted from the plurality of light emitting elements. The display panel turns on the plurality of OLEDs in a light emission sub-frame, turns off the plurality of OLEDs in a vertical scanning blanking period, and turns on the plurality of OLEDs in a light emission sub-frame, and the optical path shift element fixes the optical path in the light emission sub-frame and shifts the optical path in the vertical scanning blanking period.

5 Claims, 20 Drawing Sheets

(56) References Cited

U.S. PATENT DOCUMENTS

| | | |
|---|---|---|
| 2022/0383785 A1 | 12/2022 | Hosaka |
| 2023/0091789 A1 | 3/2023 | Momose |
| 2023/0222977 A1 | 7/2023 | Momose |

* cited by examiner

FIG. 7

PROJECTION DEVICE AND METHOD OF CONTROLLING PROJECTION DEVICE

The present application is based on, and claims priority from JP Application Serial Number 2022-039992, filed Mar. 15, 2022, the disclosure of which is hereby incorporated by reference herein in its entirety.

BACKGROUND

1. Technical Field

The present disclosure relates to, for example, a projection device and a method of controlling the projection device.

2. Related Art

In a projection device which enlarges and projects a display image of a display panel onto a screen or the like, there is known a technique for shifting an optical path of light emitted from the display panel by an optical path shift element (see, for example, Published Japanese Translation No. 2007-500868 of the PCT International Publication and JP-A-2011-158589). With this technique, it is possible to allow a user to visually recognize an image in which the resolution of the display panel is increased in a pseudo manner.

In the display panel, line-sequential driving is the mainstream, and display content is switched every time a scanning line is written. On the other hand, according to the shift of the optical path by the optical path shift element, the entire image is shifted. For this reason, for example, when the optical path is shifted when writing is executed near the center of the screen, the display content after switching is displayed in the upper half of the screen, while the display content before switching is displayed in the lower half of the screen, and thus an image before the switching and an image after the switching are visually recognized in a mixed manner.

Further, in a configuration in which the optical path is shifted after horizontal scanning is completed, it is necessary to complete the writing of all scanning lines in a short period of time in order to secure a period in which the image after the switching is visually recognized, which leads to insufficient writing.

SUMMARY

A projection device according to an aspect of the present disclosure includes a display panel including a plurality of light emitting elements configured to emit light in a predetermined direction, and an optical path shift element configured to shift an optical path of light emitted from the plurality of light emitting elements, wherein the display panel emits light in accordance with the shift of the optical path.

BRIEF DESCRIPTION OF THE DRAWINGS

FIG. 7 is a diagram illustrating a relationship between each sub-frame and an optical path shift.

FIG. 13 is a timing chart illustrating operations of the display panel and the like.

FIG. 14 is a timing chart illustrating operations of the display panel and the like.

FIG. 19 is a timing chart illustrating operations of the display panel and the like.

FIG. 20 is a timing chart illustrating operations of the display panel and the like.

DESCRIPTION OF EXEMPLARY EMBODIMENTS

Figure 1:
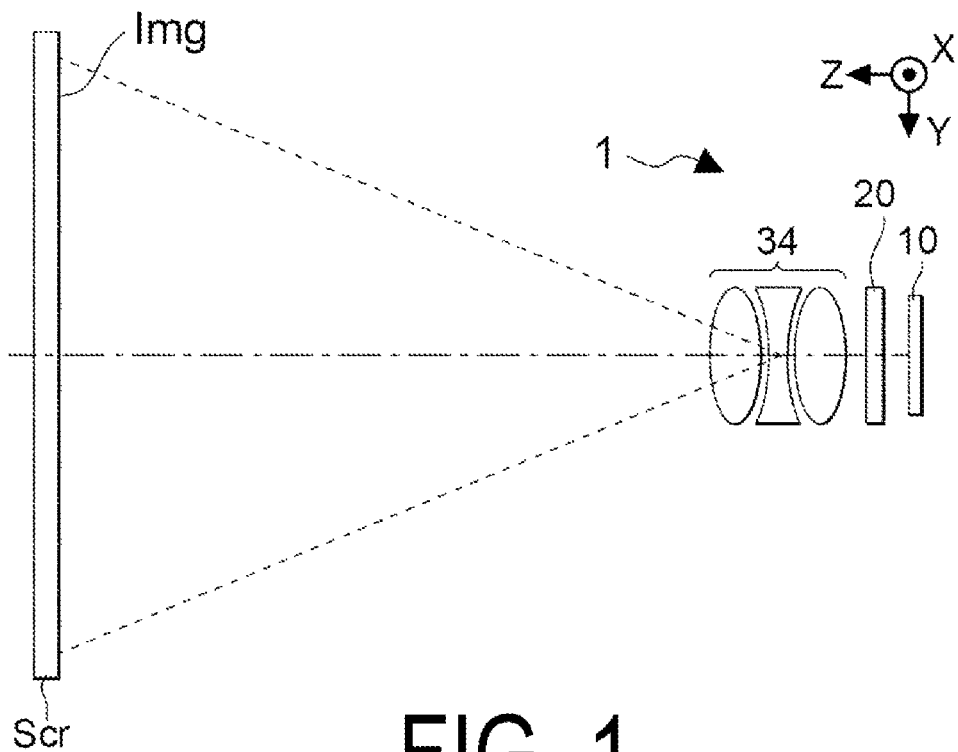
FIG. 1 is a diagram illustrating a configuration of a projection device according to a first embodiment.

Display panels according to embodiments of the present disclosure will be described below with reference to the accompanying drawings.

Note that, in the drawings, dimensions and scales of respective parts are appropriately different from actual ones. Moreover, the embodiments described below are preferable specific examples, and various technically preferable limitations are applied, but the scope of the disclosure is not limited to these modes unless they are specifically described in the following description as limiting the disclosure.

First Embodiment

Figure 2:
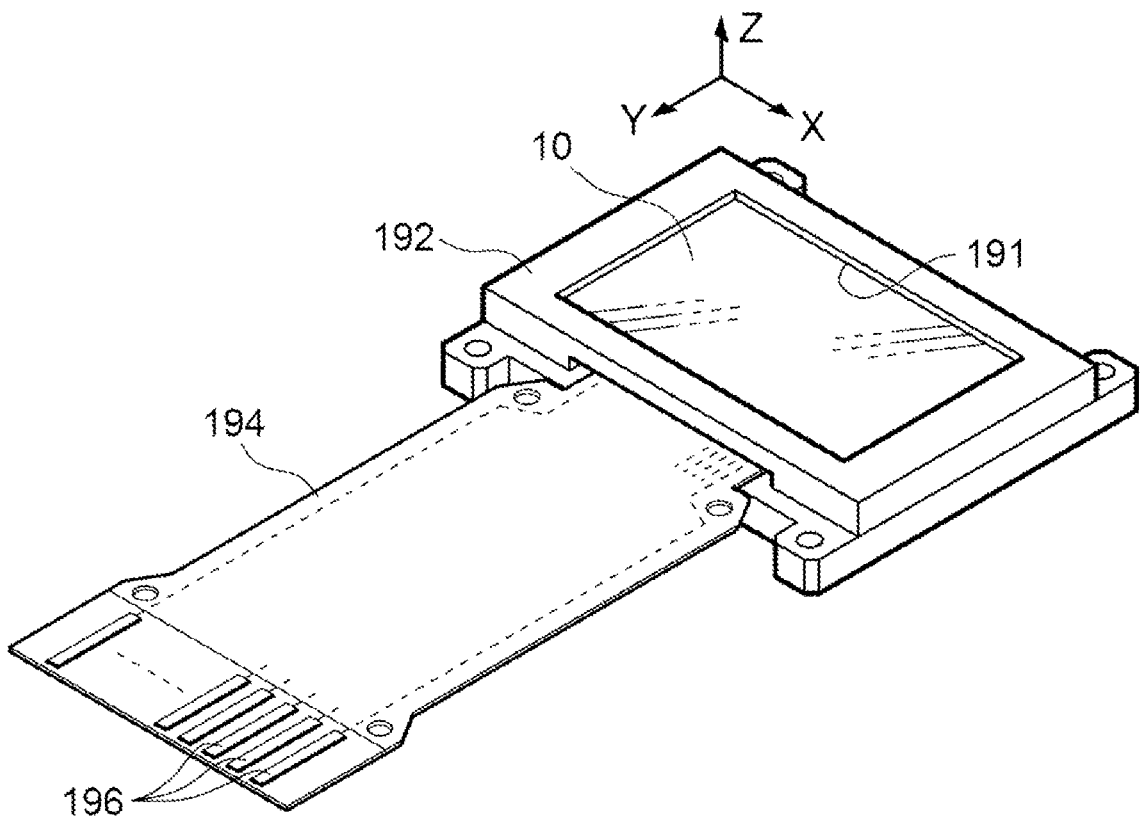
FIG. 2 is a perspective view illustrating a configuration of a display panel applied to the projection device.

FIG. 1 is a diagram illustrating a configuration of a projection device 1 according to a first embodiment, and FIG. 2 is a perspective view illustrating a configuration of a display panel 10 applied to the projection device 1. The projection device 1 enlarges and projects a color image created by the display panel 10 onto a screen Scr. The display panel 10 includes a light emitting element, and the projection device 1 does not need a separate light source and can be miniaturized. Further, the projection device 1 can display a high-resolution color image with an optical path shift element 20.

The display panel 10 is a micro-display for creating color images. In the present embodiment, a single-plate display panel in which an OLED is applied to a light emitting element is used as the display panel 10. OLED is an abbreviation for organic light emitting diode.

In the display panel 10, a plurality of pixel circuits, a drive circuit that drives the pixel circuits, and the like are formed at a semiconductor substrate. The semiconductor substrate is typically a silicon substrate, but may be a different semiconductor substrate.

As illustrated in FIG. 1, light emitted from the display panel 10 is incident on the optical path shift element 20. A projection lens 34 enlarges and projects a projection image Img via the optical path shift element 20 onto the screen Scr.

The optical path shift element 20 shifts light emitted from the display panel 10. In detail, the optical path shift element 20 is capable of shifting the projection image Img on the screen Scr in the right-left direction and the up-down direction in accordance with control that will be described later when the screen Scr, which is a projection surface, is viewed.

For convenience of description, it is necessary to distinguish pixels of the projection image Img on the screen Scr from pixels of the display panel 10. Consequently, in this description, a pixel of the projection image Img on the screen Scr is referred to as a projection pixel, and a pixel displayed by the display panel 10 is referred to as a panel pixel. Further, in the drawings, an X-direction is a left direction when the projection image Img on the screen Scr is viewed, and the Y-direction is a downward direction when the projection image Img on the screen Scr is viewed. A Z-direction is an emission direction of the projection lens 34.

As illustrated in FIG. 2, the display panel 10 is accommodated in a frame-shaped case 192 including an opening 191. One end of an FPC substrate 194 is coupled to the display panel 10. Note that "FPC" is an abbreviation for flexible printed circuit. A plurality of terminals 196 are provided at the other end of the FPC substrate 194. The plurality of terminals 196 are coupled to a video processing circuit to be described next.

Note that, in the first embodiment, the X-direction is the horizontal direction of the display pixels in the display panel 10 and coincides with an extension direction of scanning lines, and the Y-direction is the vertical direction of the display pixels and coincides with an extension direction of data lines. Further, in the present embodiment, the Z-direction coincides with the emission direction of light emitted from the OLED.

Figure 3:
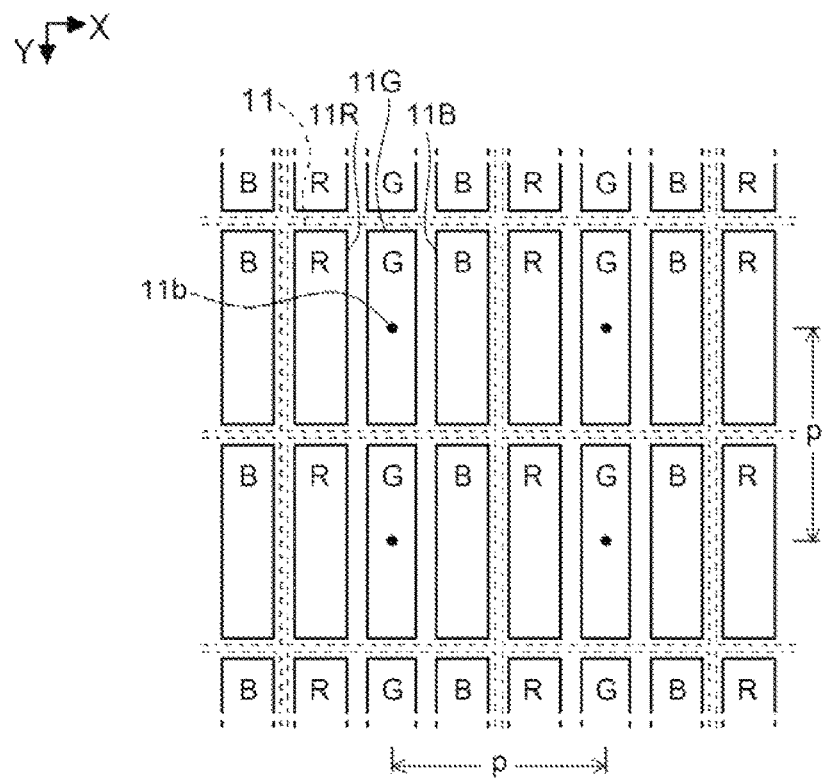
FIG. 3 is an example of a panel pixel and a sub-panel pixel in the projection device.

FIG. 3 is a diagram illustrating a configuration of panel pixels 11 in the display panel 10. As illustrated in the drawing, one panel pixel 11 is constituted by a red sub-panel pixel 11R, a green sub-panel pixel 11G, and a blue sub-panel pixel 11B.

Note that, in the display panel 10, the panel pixels 11 each having a substantially square shape in a plan view are arranged at a pitch p in the X-direction (horizontal direction) and the Y-direction (vertical direction). In addition, sign 11b denotes the center of gravity of the panel pixel 11. In FIG. 3, the center of gravity 11b is the center position of the panel pixel 11 and the center position of the green sub-panel pixel 11G. Although details will be described later, the panel pixels 11 in the display panel 10 are arranged in a matrix of m vertical rows by n horizontal columns. Both m and n are an integer equal to or greater than 2.

Figure 4:
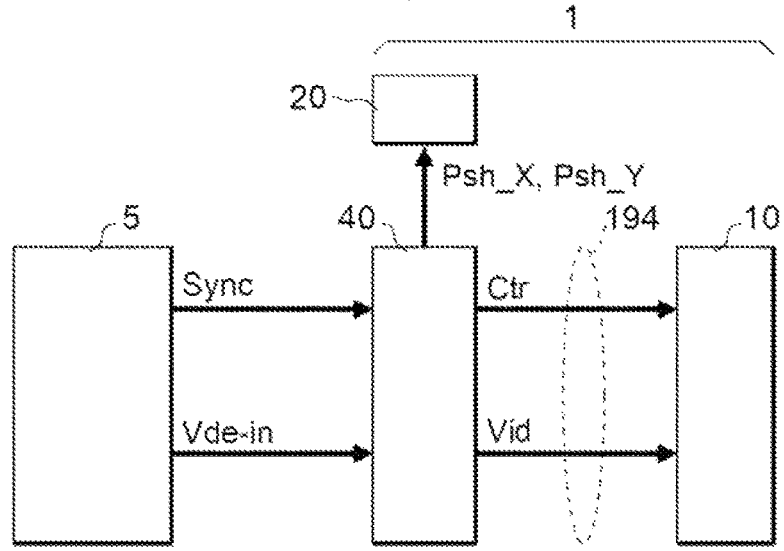
FIG. 4 is a block diagram illustrating an electrical configuration of the projection device.

FIG. 4 is a block diagram illustrating an electrical configuration of the projection device 1. As illustrated in the drawing, the projection device 1 includes a video processing circuit 40 in addition to the display panel 10 and the optical path shift element 20 described above.

Video data Vde-in is supplied to the video processing circuit 40 from a host device 5 in synchronization with a synchronization signal Sync. The video data Vde-in is data indicating a video that is displayed on the projection device 1, and more specifically, the gradation level of a color image in one frame of the video is specified, for example, by 8 bits for each of Red®, green (G), and blue (B). For convenience of description, pixels of a color image indicated by the video data Vde-in are referred to as input pixels.

The synchronization signal Sync includes a vertical synchronization signal for giving an instruction for starting vertical scanning in the video data Vid-in, a horizontal synchronization signal for giving an instruction for starting horizontal scanning, and a clock signal indicating a timing of one pixel of the video data Vid-in.

In the present embodiment, an array of the display pixels specified by the video data Vde-in is, for example, doubled in the vertical direction and doubled in the horizontal direction as compared with an array of the panel pixels in the display panel 10. Specifically, the input pixels are arranged in (2m) vertical rows by (2n) horizontal columns.

In the present embodiment, four input pixels specified by the video data Vde-in are represented by one panel pixel in the display panel 10. Consequently, first, a specific method therefor will be described.

In the present embodiment, in order to allow a projection image to be visually recognized at a resolution higher than the resolution of a panel pixel, an emission optical path from the display panel 10 (the position of the projection pixel) is shifted by the optical path shift element 20. In detail, when an image of one frame is displayed by the video data Vde-in, a period for displaying the one frame is divided into four sub-frames, and the position of a projection pixel is shifted for each sub-frame. By such a shift, one panel pixel is visually recognized as if four input pixels were displayed in one frame (four sub-frames).

Figure 5:
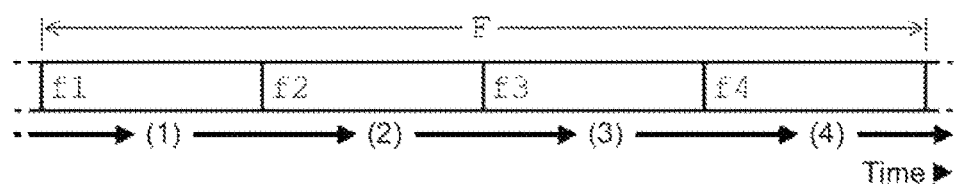
FIG. 5 is a diagram illustrating a configuration of a frame in the projection device.

FIG. 5 is a diagram illustrating a relationship between a frame and a sub-frame in the present embodiment. As illustrated in the drawing, in the present embodiment, one frame F is divided into four sub-frames, and signs f1, f2, f3, and f4 are given to the four sub-frames in chronological order. As will be described later, f1, f2, f3, and f4 correspond to shift positions (1), (2), (3), and (4) of a projection pixel, respectively.

Note that a period length of a frame F is 16.7 milliseconds of one cycle when a frequency of a vertical synchronization signal included in the synchronization signal Sync is 60 Hz. In this case, a period length of each of the sub-frames f1 to f4 is 4.17 milliseconds.

Relationships between an input pixel of which the gradation level is specified by the video data Vde-in, a panel pixel of the display panel 10, and the position of a projection pixel shifted by the optical path shift element 20 will be described. Although the optical path shift element 20 shifts the projection image Img on the screen Scr in the right-left direction and the up-down direction as described above, the amount of shift will be described in terms of the size of a projection pixel or a panel pixel on the screen Scr for the sake of convenience.

Figure 6:
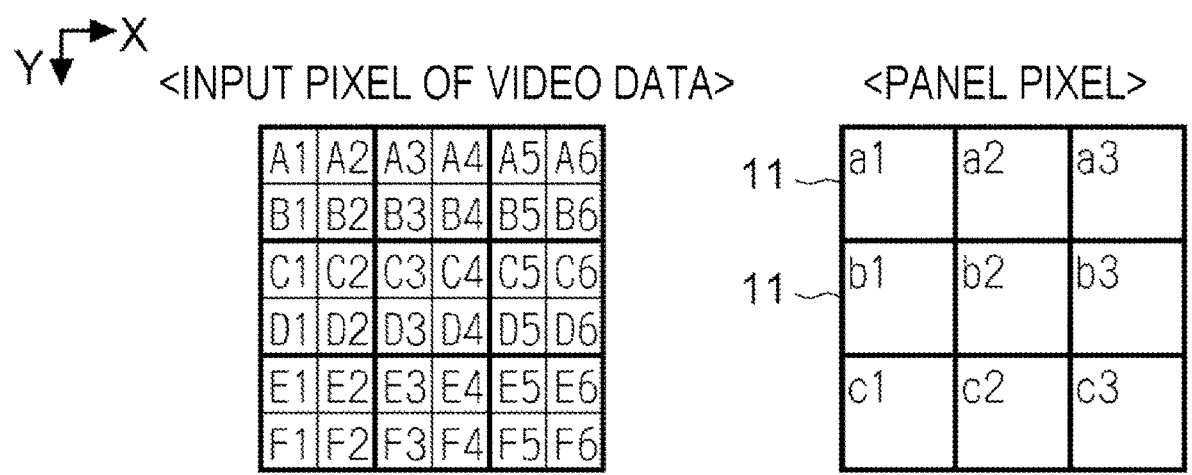
FIG. 6 is a diagram illustrating a correspondence relationship between input pixels and panel pixels.

A left column in FIG. 6 is a diagram illustrating only a part extracted from a video represented by the video data Vde-in. Further, a right column in FIG. 6 is a diagram illustrating an array of extracted panel pixels corresponding to an array of input pixels in the left column.

In the array of the input pixels of the video data Vde-in in FIG. 6, signs A1 to A6 are given to a first row, signs B1 to B6 are given to a second row, signs C1 to C6 are given to a third row, signs D1 to D6 are given to a fourth row, signs E1 to E6 are given to a fifth row, and signs F1 to F6 are given to a sixth row for the sake of convenience.

In the array of the panel pixels 11 in FIG. 6, signs a1 to a3 are given to a first row, signs b1 to b3 are given to a second row, and signs c1 to c3 are given to a third row for the sake of convenience.

In FIG. 6, a total of four (2×2) input pixels indicated by a thick line frame in an array of input pixels indicated by the video data Vde-in are represented by one panel pixel 11.

Figure 7:
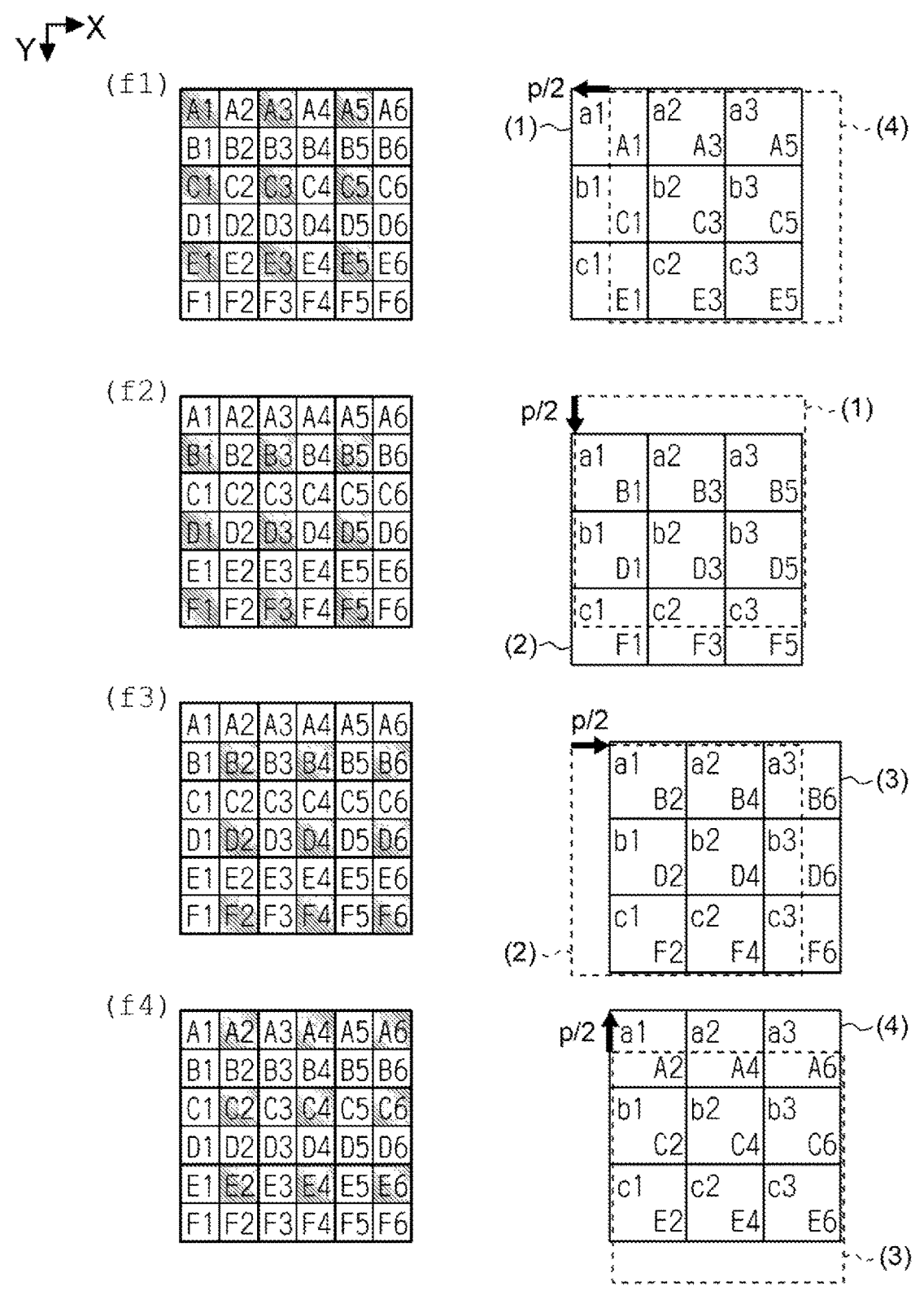

FIG. 7 is a diagram illustrating which input pixels indicated by the video data Vde-in are shifted to which positions and displayed by the panel pixels 11 of the display panel 10 in the projection device 1.

In detail, FIG. 7 is a diagram illustrating which input pixels among the input pixels in the left column of FIG. 6 are shifted to which positions in the sub-frames f1 to f4 and displayed by nine panel pixels 11 in the right column of FIG. 6. The optical path shift element 20 is controlled to shift an optical path to first to fourth optical paths in the sub-frames f1 to f4. In FIG. 7, an optical path is shifted to the first to fourth optical paths, and an image is projected at positions (1) to (4).

In a first stage of FIG. 7, the panel pixels 11 represent hatched input pixels in odd-numbered rows and odd-numbered columns among 2×2 input pixels corresponding to the panel pixels 11 by a position (1) in the sub-frame f1. For example, the panel pixel 11 at a position a1 represents an input pixel A1 by being projected at the position (1) on the screen Scr. The optical path is a first optical path. Note that the representation of the input pixel A1 by the panel pixel 11 means that OLED of RGB included in the panel pixel 11 emits light with brightness corresponding to the gradation level of the input pixel A1 specified by the video data Vde-in.

In a second row of FIG. 7, the panel pixels 11 represent hatched input pixels in even-numbered rows and odd-numbered columns among 2×2 input pixels corresponding to the panel pixels 11 by a position (2) in the sub-frame f2. For example, the panel pixel 11 at the position a1 represents an input pixel B1 by being projected at the position (2). The position (2) is a position obtained by shifting the position (1) by half of the pitch p (p/2) in the Y-direction. The optical path is a second optical path.

In a third row of FIG. 7, the panel pixels 11 represent hatched input pixels in even-numbered rows and even-numbered columns among 2×2 input pixels corresponding to the panel pixels 11 by a position (3) in the sub-frame f3. For example, the panel pixel 11 at the position a1 represents an input pixel B2 by being projected at the position (3). The position (3) is a position obtained by shifting the position (2) by half of the pitch p (p/2) in the X-direction. The optical path is a third optical path.

In a fourth row of FIG. 7, the panel pixels 11 represent hatched input pixels in odd-numbered rows and even-numbered columns among 2×2 input pixels corresponding to the panel pixels 11 by a position (4) in the sub-frame f4. For example, the panel pixel 11 at the position a1 represents an input pixel A2 by being projected at the position (4). The position (4) is a position obtained by shifting the position (3) by half of the pitch p (p/2) in a direction opposite to the Y-direction. The optical path is a fourth optical path.

Note that, when shifting from the sub-frame f4 to the sub-frame f1 of the next frame, a projection pixel is shifted from the position (4) by half of the pitch p in a direction opposite to the X-direction and returns to the position (1). The optical path is returned to the first optical path by the optical path shift element 20.

Figure 8:
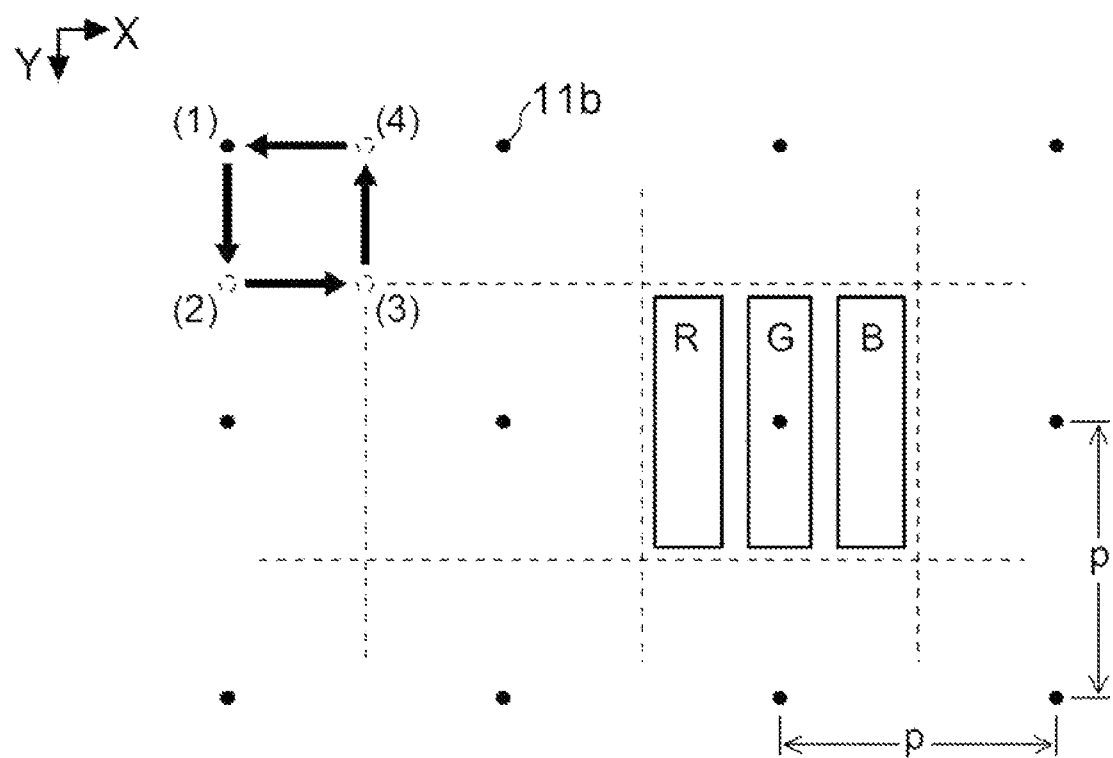
FIG. 8 is a diagram illustrating projection pixels obtained by the projection device.
Figure 9:
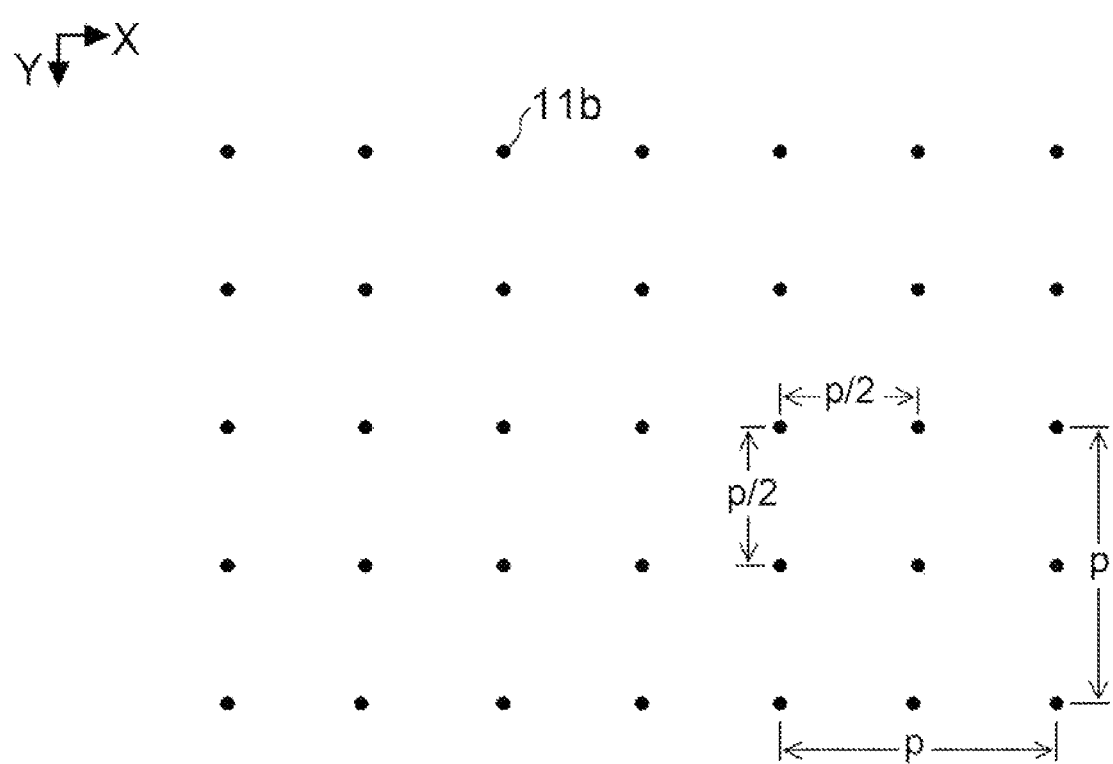
FIG. 9 is a diagram illustrating projection pixels visually recognized in one frame F.

When focusing on the center of gravity 11*b* of the panel pixel 11, the center of gravity 11*b* is sequentially shifted by half of the pitch p at the positions (1) to (4). For this reason, when viewed from the sub-frames f1 to f4, the centers of gravity 11*b* are arranged at a pitch p/2 in each of the Y-direction and the X-direction as illustrated in FIG. 9. FIG. 8 is a diagram illustrating the arrangement of projection pixels in which the center of gravity 11*b* of the panel pixel 11 is projected, for example, at the position (1) in the display panel 10 illustrated in FIG. 3 by the optical path shift element 20. In FIG. 8, the center of gravity 11*b* projected at the position (1) is indicated by a black circle, and a state where the projection pixel is shifted to the positions (2) to (4) is indicated by arrows in a part thereof. FIG. 9 illustrates the state of the centers of gravity 11*b* of projection pixels which are projected and visually recognized at the positions (1) to (4) in one frame F.

For this reason, in the display panel 10, although the panel pixels 11 are arranged in m vertical rows×n horizontal columns, the projection pixels can be visually recognized as if they were arranged in (2m) vertical rows×(2n) horizontal columns through a shift performed by the optical path shift element 20. In other words, in the present embodiment, the resolution of the display panel 10 is doubled in the vertical direction and doubled in the horizontal direction, that is, overall quadrupled in a pseudo manner.

Although FIGS. 8 and 9 illustrate an example in which shift amounts in the X and Y-directions are set to ½ times the pitch p, the shift amounts can be generally set to {k+(p/2)} in a similar arrangement. Note that k is an integer equal to or greater than "0".

For example, k may be set to "1" so that the shift amounts are set to 3/2 times the pitch p, or k may be set to "2" so that the shift amounts are set to 5/2 times the pitch p. However, it should be noted that, when k is made too large, a shift amount of the optical path shift element 20 is increased, and it takes time to make a shift, or an increase in speed is required for the optical path shift element 20.

Referring back to FIG. 4, the video processing circuit 40 divides the video data Vde-in supplied from the host device 5 into the sub-frames f1 to f4 and supplies the divided video data to the display panel 10 as video data Vid. In detail, the video processing circuit 40 temporarily stores the video data Vde-in, reads out the video data Vde-in corresponding to the input pixels corresponding to the sub-frame from the stored video data Vde-in for each of the sub-frames f1 to f4, and supplies the read-out video data Vde-in to the display panel 10 as the video data Vid.

The video processing circuit 40 outputs a control signal Ctr for controlling driving of the display panel 10 for each of the sub-frames f1 to f4.

In addition, the video processing circuit 40 outputs control signals Psh_X and Psh_Y for controlling the optical path shift element 20 for each of the sub-frames f1 to f4.

Figure 10:
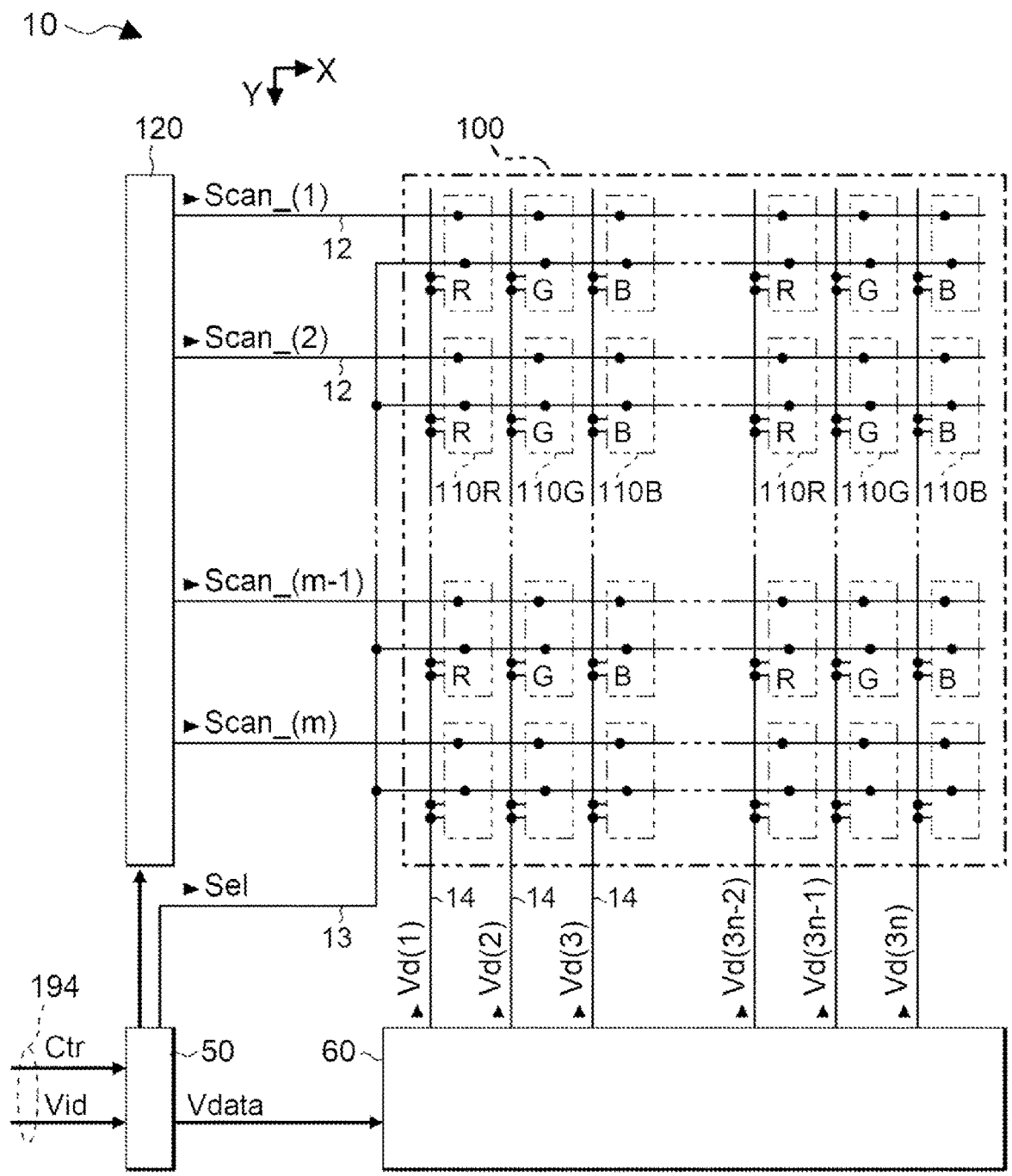
FIG. 10 is a block diagram illustrating an electrical configuration of the display panel.

FIG. 10 is a diagram illustrating an electrical configuration of the display panel 10. As illustrated in the drawing, the display panel 10 is roughly classified into a control circuit 50, a data signal output circuit 60, and a scanning line drive circuit 120.

In the display panel 10, scanning lines 12 of m rows are provided in the X-direction in the drawing, and data lines 14 in the (3n)-th column are provided in the Y-direction to be electrically insulated from the scanning lines 12.

In order to distinguish the rows from each other in the scanning lines 12, the rows are referred to as first, second, third, . . . , (m−1)-th, and m-th rows in order from the top in the drawing. Note that, in order to generally describe the scanning line 12 without specifying a row, the scanning line 12 may be referred to as an i-th row using an integer i of 1 or more and m or less.

Further, in order to distinguish the columns from each other in the data lines 14, the columns may be referred to as first, second, third, . . . , (3n−2)-th, (3n−1)-th, and (3n)-th columns in order from the left in the drawing. Note that the data lines 14 are grouped every three columns. In order to generalize and describe a group of the data lines 14, when an integer j of 1 or more and n or less is used, the data lines 14 in a total of three columns, that is, (3j−2)-th, (3j−1)-th, and (3j)-th columns belong to a j-th group as counting from the left.

Pixel circuits 110R, 110G, and 110B are provided corresponding to the data lines 12 arranged in m rows and the data lines 14 arranged in (3n) columns. In detail, the pixel circuits 110R are provided corresponding to intersections between the scanning lines 12 of the i-th row and the data lines 14 of the (3j−2)-th column. The pixel circuits 110G are provided corresponding to intersections between the scanning lines 12 of the i-th row and the data lines 14 of the (3j−1)-th column. The pixel circuits 110B are provided corresponding to intersections between the scanning lines 12 of the i-th row and the data lines 14 of the (3j)-th column.

A region in which the pixel circuits 110R, 110G, and 110B are arranged in m vertical rows by (3n) horizontal columns is a display region 100.

The pixel circuit 110R emits red light, the pixel circuit 110G emits green light, and the pixel circuit 110B emits blue light. For this reason, the sub-panel pixel 11R is represented by the pixel circuit 110R, the sub-panel pixel 11G is represented by the pixel circuit 110G, and the sub-panel pixel 11B is represented by the pixel circuit 110B.

Note that the pixel circuits 110R, 110B, and 110G are circuits for representing the sub-panel pixels 11R, 11G, and 11B in order, and thus the pixel circuits should be referred to as sub-pixel circuits in a strict sense, but will be referred to as pixel circuits for the sake of convenience in this description.

The control circuit 50 controls each portion based on the video data Vid and the control signal Ctr supplied from the video processing circuit 40. The control circuit 50 generates various control signals, and details thereof will be described later as appropriate.

Although the gradation level of the input pixel is specified by, for example, 8 bits for each of RGB in the video data Vde-in as described above, the characteristics of brightness specified by the gradation level do not necessarily match the brightness characteristics of the OLED included in the panel pixel 11. Consequently, in order to cause the OLED to emit light at the gradation level specified by the video data Vde-in with brightness corresponding to the gradation level, the control circuit 50 up-converts 8 bits of each of RGB in the video data Vde-in into, for example, 10 bits in the present embodiment, and outputs the brightness of the OLED of RGB as video data Vdata to be specified. In such up-conversion, a look-up table in which a correspondence relationship between 8 bits of the video data Vid-in which is an input and 10 bits of the video data Vdata which is an output is stored in advance is used.

Although not illustrated in FIG. 4, the control circuit 50 supplies a control signal Enb to all of the pixel circuits 110R, 110G, and 110B in common.

The scanning line drive circuit 120 is a circuit for driving the pixel circuits 110R, 110G, and 110B, which are arranged in the m-th row and the (3n)-th column, for each row in accordance with the control of the control circuit 50.

Specifically, the scanning line drive circuit 120 sequentially supplies scanning signals Scan(1), Scan(2), . . . , Scan(m−1), and Scan(m) to the scanning lines 12 of the first, second, third, . . . , (m−1)-th, and m-th rows. In general, a scanning signal supplied to the scanning line 12 in the i-th row is denoted by Scan(i). Note that, in FIG. 10, the number of scanning lines 12 of one row is one in order to avoid complication of the drawing, but actually, the number of scanning lines is "two" for one row. That is, actually, the scanning signals Scan_a(i) and Scan_b(i) are supplied to the two scanning lines 12 corresponding to the i-th row.

The data signal output circuit 60 is a circuit for outputting a data signal having a voltage corresponding to a gradation level toward the pixel circuits 110R, 110G, and 110B positioned in a row selected by the scanning line drive circuit 120. In detail, the data signal output circuit 60 latches the video data Vdata, which is supplied from the control circuit 50, for one row, converts the latched video data Vdata for one row into an analog data signal, and outputs the analog data signal to the corresponding data line 14 as a data signal.

Note that the potentials of the data lines 14 in the first, second, third, . . . , (3n−2)-th, (3n−1)-th, and (3n)-th columns are denoted by Vd(1), Vd(2), Vd(3), . . . , Vd(3n−2), Vd(3n−1), and Vd(3n), respectively.

Further, in this description, the reference for zero voltage is an L level (ground potential) of a logic level, but a potential and a voltage are not strictly used for different meanings in this description, except for a voltage (threshold voltage) between two points. Further, in this description, a power supply is a voltage or a potential that is substantially fixed over time.

The pixel circuits 110R, 110G, and 110B have the same electrical configuration. For this reason, the electrical configurations of the pixel circuits 110R, 110G, and 110B will be described with the pixel circuit 110R positioned in the i-th row and (3j−2)-th column as a representative.

Figure 11:
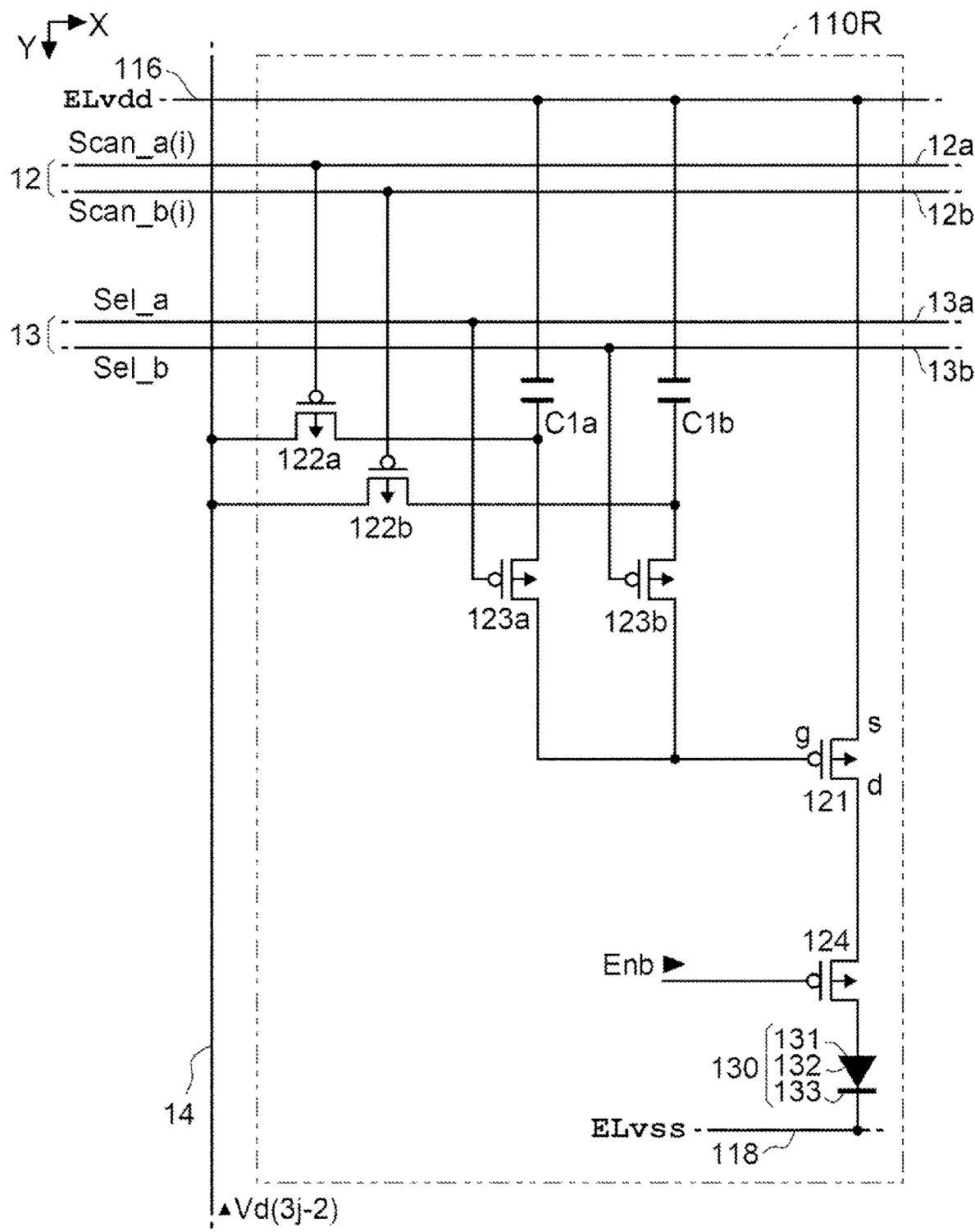
FIG. 11 is a diagram illustrating a pixel circuit in the display panel.

FIG. 11 is a circuit diagram illustrating an electrical configuration of the pixel circuit 110R positioned in the i-th row and the (3j−2)-th column. As illustrated in the drawing, the panel pixel 110R includes an OLED 130, p-channel MOS type transistors 121, 122$a$, 122$b$, 123$a$, 123$b$, and 124, and capacitive elements C1$a$ and C1$b$. Note that MOS is an abbreviation for Metal-Oxide-Semiconductor field-effect transistor.

The scanning signal Scan_a(i) is supplied to the pixel circuits 110R, 110G, and 110B in the i-th row via one scanning line 12$a$ of the two scanning lines 12 corresponding to the i-th row, and the scanning signal Scan_b(i) is supplied thereto via the other scanning line 12$b$.

The OLED 130 is a light emitting element in which a light emitting function layer 132 is sandwiched between a pixel electrode 131 and a common electrode 133. The pixel electrode 131 functions as an anode, and the common electrode 133 functions as a cathode. Note that the common electrode 133 has light reflectivity and light transmittance. When a current flows from the anode to the cathode in the OLED 130, holes injected from the anode and electrons injected from the cathode are recombined in the light emitting function layer 132 to generate excitons, and white light is generated.

Note that, when the pixel circuits 110R, 110G, and 110B are viewed individually, the generated white light resonates in an optical resonator constituted by a reflective layer and a semi-reflective semi-transmissive layer which are not illustrated in the drawing, and is emitted at resonance wavelengths that are set corresponding to red, green, and blue. A color filter corresponding to the color is provided in the Z-direction which is an emission direction of light from the optical resonator. Thus, light emitted from the OLED 130 is visually recognized through coloration performed by the optical resonator and the color filter. The optical resonator is not illustrated in the drawing.

In the pixel circuit 110R in the i-th row and the (3j−2)-th column, a source node of the transistor 122a is coupled to the data line 14 of the (3j−2)-th column, a drain node thereof is coupled to one end of the capacitive element C1a and a source node of the transistor 123a, and a gate node thereof is coupled to the scanning line 12a. In the transistor 122b, a source node is coupled to the data line 14 of the j-th column, a drain node is coupled to one end of the capacitive element C1b and a source node of the transistor 123b, and a gate node is coupled to the scanning line 12b. The other end of the capacitive element C1a and the other end of the capacitive element C1b are coupled to a power supply wiring 116 to which a high power supply potential ELVdd is supplied.

In the transistor 123a, a gate node is coupled to a control line 13a to which a selection signal Sel_a is supplied. In the transistor 123b, a gate node is coupled to a control line 13b to which a selection signal Sel_b is supplied. A drain node of the transistor 123a and a drain node of the transistor 123b are coupled to a gate node g of the transistor 121.

In the transistor 121, a source node s is coupled to the power supply wiring 116, and a drain node d is coupled to a source node of the transistor 124. In the transistor 124, a control signal Enb is supplied to a gate node, and a drain node is coupled to the pixel electrodes 131 on the OLED 130. Note that, on the OLED 130, a low power supply potential ELvss is supplied to the common electrode 133 via a power supply wiring 118.

Note that, in the present description, "being electrically coupled" or simply "coupled" means direct or indirect connection or coupling between two or more elements, and also includes, for example, a case where two or more elements are not directly coupled to each other in a semiconductor substrate but are coupled to each other via different wiring layers and contact holes.

Figure 12:
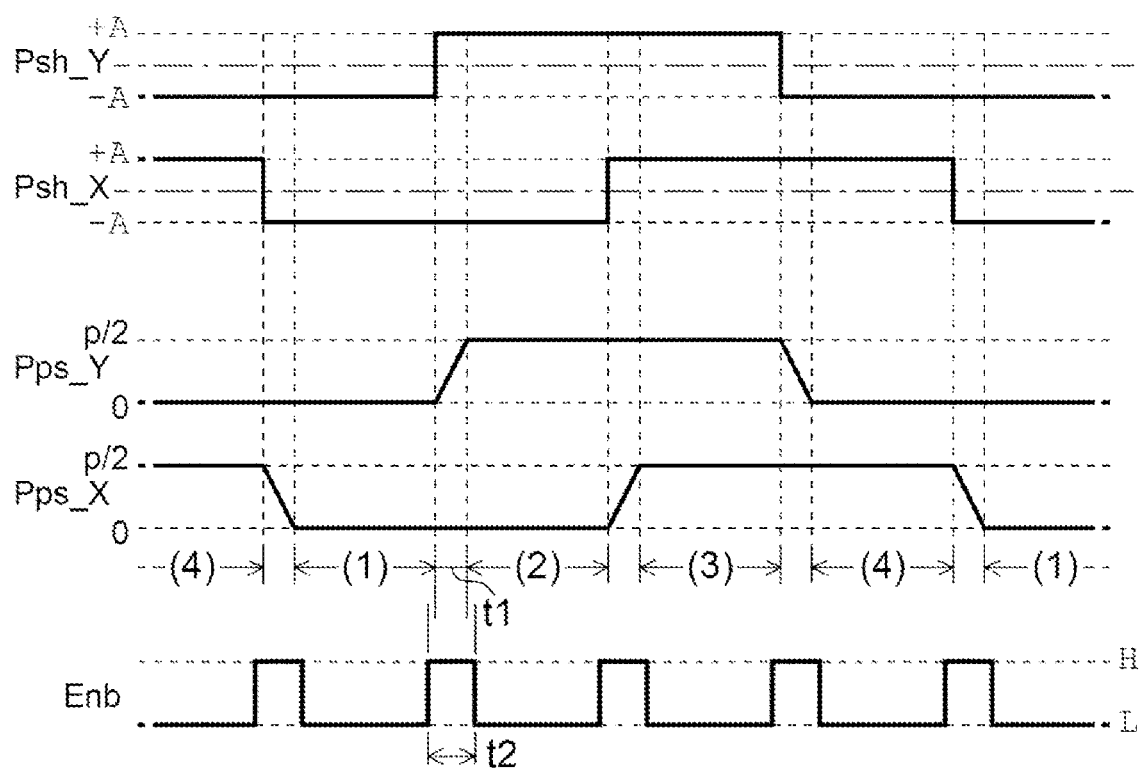
FIG. 12 is a timing chart illustrating control signals and the like of an optical path shift element.

FIG. 12 is a timing chart illustrating operations and the like of the optical path shift element 20. The video processing circuit 40 supplies control signals Psh_Y and Psh_X to the optical path shift element 20 to shift the projection image Img on the screen Scr in the Y-direction and the X-direction. In detail, the control signal Psh_Y shifts the position of the projection image Img with respect to the screen Scr in the Y-direction, and the control signal Psh_X shifts the position of the projection image Img in the X-direction. The control signals Psh_Y and Psh_X take voltages −A or +A, respectively. The optical path is changed to the first to fourth optical paths in accordance with the voltage of the control signal Psh_Y or Psh_X. When there is no change in the voltages of the control signals Psh_Y and Psh_X, the optical path is maintained.

Here, when the voltage of the control signal Psh_Y is −A and the voltage of the control signal Psh_X is −A, it is assumed that the projection image Img is at the position (1) on the screen Scr. For the sake of convenience, it is assumed that coordinate positions Pps_Y and Pps_X of a certain projection pixel (for example, a projection pixel at the upper left end in the display region 100) of the projection image Img at the position (1) are both 0 as a reference. The optical path in this case is the first optical path.

When the voltage of the control signal Psh_Y changes to +A, the position of the projection pixel is shifted by half the pitch p in the Y-direction, and the coordinate position Pps_Y is set to p/2. When the voltage of the control signal Psh_X changes to +A, the position of the projection pixel is shifted by half the pitch p in the X-direction, and the coordinate position Pps_X is set to p/2.

For this reason, the projection pixel is at the position (1) when the voltage of the control signal Psh_Y is −A and the voltage of the control signal Psh_X is −A, and the projection pixel is at the position (2) when the voltage of the control signal Psh_Y is +A and the voltage of the control signal Psh_X is −A. In addition, the projection pixel is at the position (3) when the voltage of the control signal Psh_Y is +A and the voltage of the control signal Psh_X is +A, and the projection pixel is at the position (4) when the voltage of the control signal Psh_Y is −A and the voltage of the control signal Psh_X is +A.

Note that, even when the control signals Psh_Y and Psh_X change to the voltage −A or +A, the position of the projection pixel (projection image Img) shifted by the optical path shift element 20 is not immediately determined, but is delayed by a period t1. That is, when the period t1 elapses after the voltage of the control signal Psh_Y or Psh_X changes, the position of the projection pixel is stabilized.

Further, the control circuit 50 outputs the following control signal Enb in response to changes in outputs of the control signals Psh_Y and Psh_X by the video processing circuit 40. That is, the control circuit 50 outputs the control signal Enb which is set to be at an H level in a period t2 including the period t1 and is set to be at an L level in the other periods.

Figure 13:
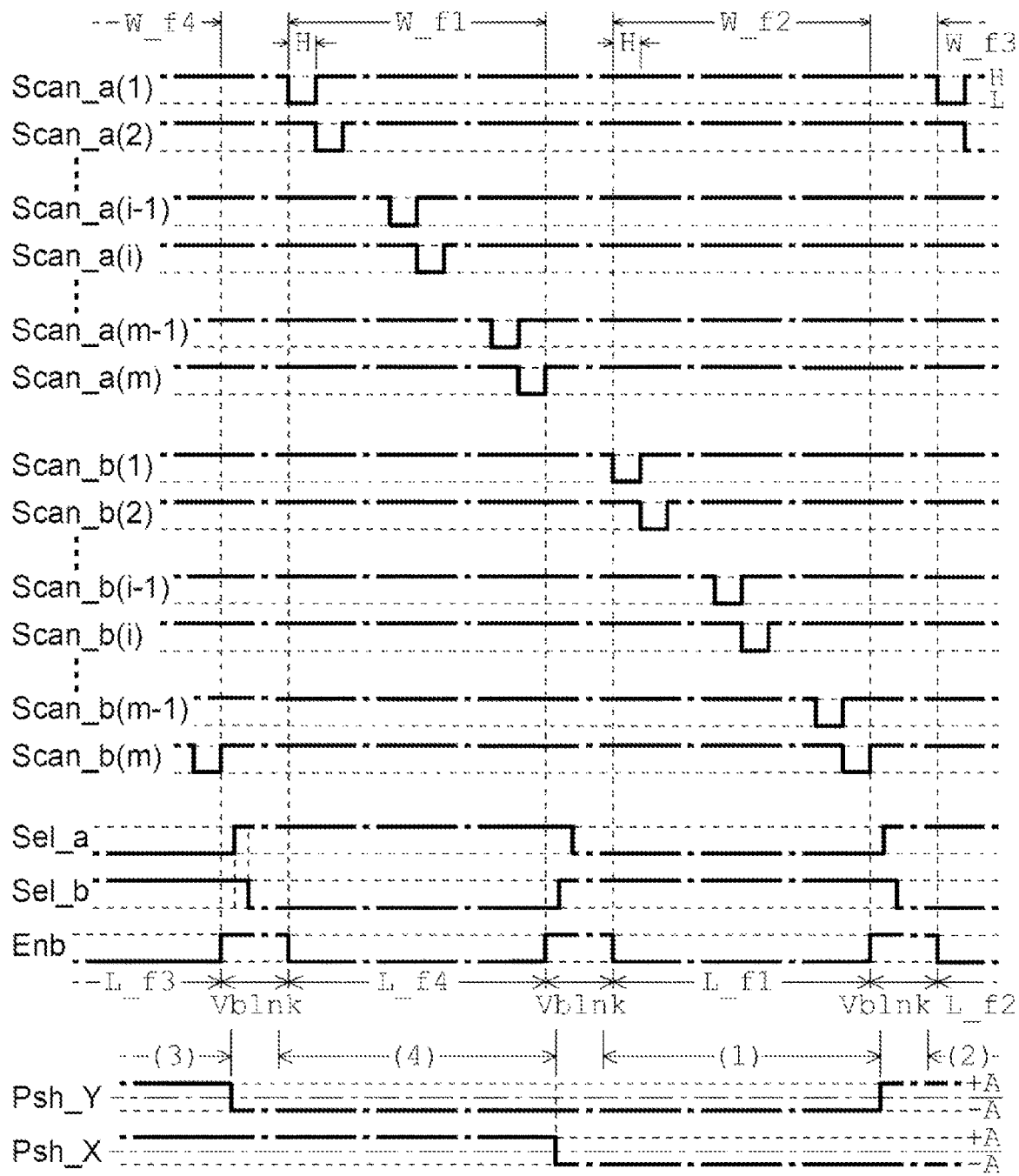
Figure 14:
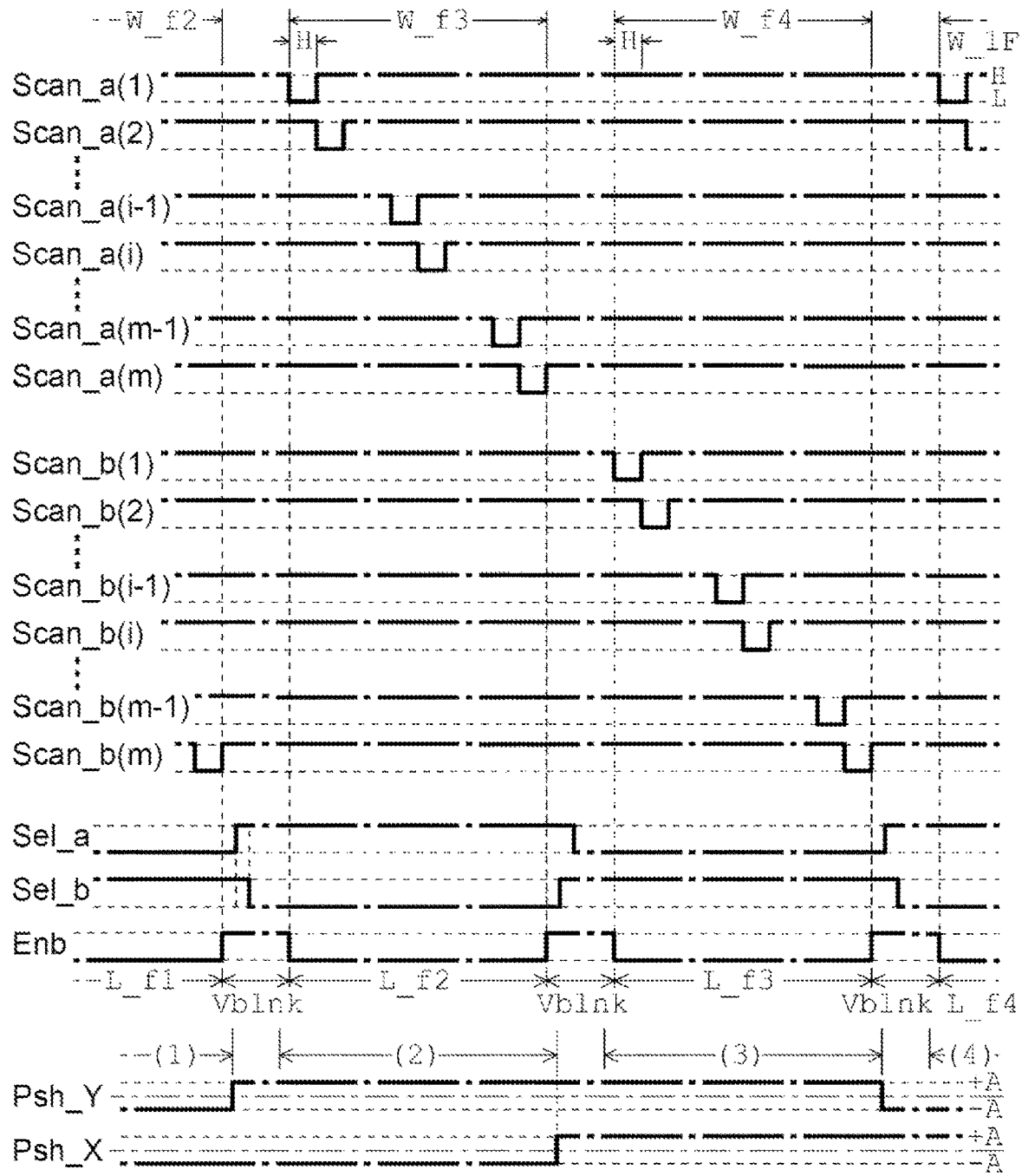

FIGS. 13 and 14 are timing charts illustrating operations of the projection device 1.

As described above, one frame F is constituted by four sub-frames f1 to f4, which correspond to a first period to a fourth period, respectively. In the present embodiment, the sub-frame is constituted by writing sub-frames W_f1 to Wf4 for writing a data signal to the pixel circuits 110R, 110G, and 110B and a vertical scanning blanking period Vblnk from the viewpoint of data writing. Further, in the present embodiment, the sub-frame is constituted by light emission sub-frames L_f1 to L_f4 for making a current based on a voltage of a written data signal flow to the OLED 130 and the vertical scanning blanking period Vblnk from the viewpoint of light emission.

In detail, the writing sub-frames W_f1 to W_f4 are periods for sequentially writing data signals corresponding to the sub-frames f1 to f4 to the pixel circuits 110R, 110G, and 110B, and the light emission sub-frames L_f1 to L_f4 are periods for sequentially making a current based on the voltage of the data signals written in the writing sub-frames W_f1 to W_f4 flow to the OLED 130 to emit light.

Further, in the present embodiment, the first to fourth periods correspond to the writing sub-frames W_f1 to Wf4 or the light emission sub-frames L_f4 and L_f1 to L_f3, respectively. The vertical scanning blanking period Vblnk corresponds to a turn-off period.

Note that, in the present embodiment, the periods of the writing sub-frames W_f1 to W_f4 coincide with the periods of the light emission sub-frames L_f4 and Lf1 to L_f3, respectively. In addition, writing is an operation of holding the voltage of a data signal in the capacitive element C1a or C1b.

In the writing sub-frames W_f1 and W_f3, scanning signals Scan_a(1), Scan_a(2), . . . , Scan_a(m−1), and Scan_a(m) are sequentially and exclusively set to be at an L level for each horizontal scanning period H. Further, in the writing sub-frames W_f2 and W_f4, scanning signals Scan_b(1), Scan_b(2), . . . , Scan_b(m−1), and Scan_b(m) are sequentially and exclusively set to be at an L level for each horizontal scanning period H.

In the present embodiment, a period from when the scanning signal Scan_a(1) changes to an L level to when the scanning signal Scan_a(m) changes to an H level in the writing sub-frame W_f1 (or W_f3) and a period from when the scanning signal Scan_b(1) changes to an L level to when the scanning signal Scan_b(m) changes to an H level in the writing sub-frame W_f2 (or W_f4) may be referred to as a vertical effective scanning period.

In addition, a period other than the vertical effective scanning period, specifically, a period from when the scanning signal Scan_a(m) changes to an H level in the writing sub-frame W_f1 (or W_f3) to when the scanning signal Scan_b(1) changes to an L level in the writing sub-frame W_f2 (or W_f4), and a period from when the scanning signal Scan_b(m) changes to an H level in the writing sub-frame W_f2 (or W_f4) to when the scanning signal Scan_a(1) changes to an L level in the writing sub-frame W_f3 (or W_f1) are the vertical scanning blanking period Vblnk.

In the present embodiment, the control signal Enb is set to be at an L level in the light emission sub-frames L_f2, L_f3, L_f4, and L_f1 which are vertical effective scanning periods, and is set to be at an H level in the vertical scanning blanking period which is the other period. Note that the vertical scanning blanking period corresponds to the above-described period t2.

In addition, the control signal Psh_Y of the optical path shift element 20 is set to be at a voltage −A when the writing sub-frame W_f4 ends, and is set to be at a voltage +A when the writing sub-frame W_f2 ends. The control signal Psh_X is set to be at a voltage −A when the writing sub-frame W_f1 ends, and is set to be at a voltage +A when the writing sub-frame W_f3 ends.

Although not illustrated in FIGS. 13 and 14, after the voltage of the control signal Psh_Y or Psh_X changes when the vertical scanning blanking period starts, the shift of the optical path by the optical path shift element 20 is completed until the start of the next vertical effective scanning period, and this state is maintained, whereby the position by the projection pixel is stabilized.

In the first embodiment, the selection signal Sel_a is set to be at an H level and the selection signal Sel_b is set to be at an L level in the writing sub-frames W_f1 and W_f3 (the light emission sub-frames L_f4 and L_f2), and the selection signal Sel_a is set to be at an L level and the selection signal Sel_b is set to be at an H level in the writing sub-frames W_f2 and W_f4 (the light emission sub-frames L_f1 and L_f3).

Note that, in the vertical scanning blanking period after the writing sub-frames W_f1 and W_f3, the selection signal Sel_b changes from the L level to the H level earlier in time, and the selection signal Sel_a changes from the H level to the L level later in time. In the vertical scanning blanking period after the writing sub-frames W_f2 and W_f4, the selection signal Sel_a changes from the L level to the H level earlier in time, and the selection signal Sel_b changes from the H level to the L level later in time.

Operations of the projection device 1 in the writing sub-frame W_f1 will be described.

In the writing sub-frame W_f1, the following three operations are mainly performed.

In detail, in the writing sub-frame W_f1, first, an operation of input pixels in odd-numbered rows and odd-numbered columns, among input pixels arranged in (2m) vertical rows by (2n) horizontal columns in the video data Vde-in, in the capacitive elements C1a of the pixel circuits 110R, 110G, and 110B as the video data Vdata is executed.

In the writing sub-frame W_f1, secondly, an operation of shifting the projection pixel to the position (4) by the optical path shift element 20 is executed. The optical path is shifted to the fourth optical path.

In the writing sub-frame W_f1, that is, the light emission sub-frame L_f4, third, an operation of supplying a current corresponding to a voltage held in the capacitive elements C1b of the pixel circuits 110R, 110G, and 110B to the OLED 130 is executed.

A first operation will be described in detail. In the writing sub-frame W_f1, the video processing circuit 40 outputs input pixels in odd-numbered rows and odd-numbered columns, among input pixels arranged in (2m) vertical rows by (2n) horizontal columns in the video data Vde-in supplied from the host device 5, as the video data Vid. Note that the input pixels in odd-numbered rows and odd-numbered columns, among the input pixels arranged in (2m) vertical rows by (2n) horizontal columns, are hatched input pixels at the first stage (sub-frame f1) in FIG. 7.

In the writing sub-frame W_f1, the control circuit 50 converts the video data Vde-in into the video data Vdata in each row in accordance with a timing at which the scanning signals Scan_a(1) to Scan_a(m) are sequentially set to be at an L level, and outputs the video data Vdata.

Further, for example, during a period in which the scanning signal Scan_a(i) is set to be at an L level in the writing sub-frame W_f1, the data signal output circuit 60 converts the gradation levels of the sub-panel pixels 11R, 11G, and 11B in the i-th row and the first column to the i-th row and the (3n)-th column indicated by the video data Vdata into the analog potentials Vd(1) to Vd(3n), and outputs the potentials Vd(1) to Vd(3n) to the data lines 14 in the first to (3n)-th columns as data signals.

In the (3j−2)-th column, the data signal output circuit 60 converts a gradation level corresponding to the sub-panel pixel 11R in the i-th row and the (3j−2)-th column in the video data Vdata into a potential Vd(3j−2) of an analog signal, and outputs the potential Vd(3j−2) to the data line 14 in the (3j−2)-th column as a data signal.

Note that the gradation level corresponding to the sub-panel pixel 11R in the i-th row and the (3j−2)-th column is a gradation level obtained by converting a 8-bit gradation level corresponding to an R component in an input pixel in the (2i−1)-th row and the j-th column, among the input pixels arranged in (2m) vertical rows by (2n) horizontal columns, into 10 bits.

When the scanning signal Scan_a(i) is set to be at an L level, the transistor 122a is set to be in an ON state in the pixel circuit 110 in the i-th row and the (3j−2)-th column. Since the scanning signal Scan_b(i) is set to be at an H level in a period in which the scanning signal Scan_a(i) is set to be at an L level, the transistor 122b is in set to be in an OFF state in the pixel circuit 110 in the i-th row and the (3j−2)-th column.

For this reason, the data signal of the potential Vd(3j−2) is held in the capacitive element C1a via the data line 14 in the (3j−2)-th column and the transistor 122a in the pixel circuit 110R in the i-the row and the (3j−2)-th column in order. Although the pixel circuit 110R in the i-th row and the (3j−2)-th column has been described here, data signals are similarly held in the capacitive elements C1a for the pixel circuits 110R, 110G, and 110B in the columns other than the (3j−2)-th column in the i-th row.

Note that, in the present description, an "ON state" of a switching element or a transistor means that a distance between both ends of the switching element or between a source node and a drain node in the transistor is electrically closed and set to be in a low impedance state. In addition, an "OFF state" of a switching element or a transistor means that a distance between both ends of the switching element or between a source node and a drain node in the transistor is electrically opened and set to be in a high impedance state.

In the writing sub-frame W_f1, the scanning signals Scan_a(1) to Scan(m) are sequentially and exclusively set to be at an L level even in a row other than the i-th row, and thus data signals are held in the capacitive elements C1a in all of the pixel circuits 110R, 110G, and 110B.

A second operation will be described in detail. The video processing circuit 40 sets the control signal Psh_Y to be at a voltage −A and sets the control signal Psh_X to be at a voltage +A after the writing sub-frame W_f4. For this reason, in the light emission sub-frame L_f4, the projection pixel is shifted to the position (4) and is stabilized. The optical path is shifted to the fourth optical path, and the state is maintained.

A third operation will be described in detail. In the writing sub-frame W_f1, the selection signal Sel_a is set to be at an H level, and the selection signal Sel_b is set to be at an L level. For this reason, in all of the pixel circuits 110R, 110G, and 110B, the transistor 123a is set to be in an OFF state, and the transistor 123b is set to be in an ON state.

Thus, in all of the pixel circuits 110R, 110G, and 110B, one end of the capacitive element C1b is electrically coupled to the gate node g of the transistor 121 via the transistor 123b, and thus a voltage held in the capacitive element C1b is applied between the gate node and the source node in the transistor 121. Further, in the writing sub-frame W_f1 (light emission sub-frame L_f4), the control signal Enb is set to be at an L level, and thus the transistor 124 is set to be in an ON state.

For this reason, in the light emission sub-frame L_f4, the transistor 121 makes a voltage between the gate node and the source node, that is, a current corresponding to the gradation level of the pixel, flow to the OLED 130 in all of the pixel circuits 110R, 110G, and 110B.

The voltage held in the capacitive element C1b is based on the data signal supplied via the data line 14 in the writing sub-frame W_f4 in the previous frame. For this reason, in the light emission sub-frame L_f4, the OLEDs 130 in all of the pixel circuits 110R, 110G, and 110B emit light with brightness corresponding to the sub-panel pixels 11R, 11G, and 11B in the sub-frame f4. In addition, a projection pixel according to the light emission is visually recognized at the position (4) on the screen Scr.

The operations of the projection device 1 in the writing sub-frame W_f2 are the same as those in the writing sub-frame W_f1 except for the following points.

That is, the operations in the writing sub-frame W_f2 are different from the operations in the writing sub-frame W_f1 in that, first, the video processing circuit 40 outputs input pixels in even-numbered rows and odd-numbered columns, among the input pixels arranged in (2m) vertical rows by (2n) horizontal columns in the video data Vde-in, as the video data Vdata in the writing sub-frame W_f2, secondly, the video processing circuit 40 sets the control signal Psh_Y to be at a voltage −A and sets the control signal Psh_X to be at a voltage −A to set the projection pixel of the optical path shift element 20 to be at the position (1), and thirdly, the control circuit 50 sets the selection signal Sel_a to be at an L level and sets the selection signal Sel_b to be at an H level. The optical path is shifted to the first optical path, and the state is maintained.

In the writing sub-frame W_f2, in all of the pixel circuits 110R, 110G, and 110B, a voltage of a data signal corresponding to an input pixel in an even-numbered row and an odd-numbered column among the input pixels arranged in (2m) vertical rows by (2n) horizontal columns in the video data Vde-in is held in the capacitive element C1b, while a current corresponding to the voltage held in the capacitive element C1a (the voltage written in the sub-frame Wf_1) is supplied to the OLED 130.

Thus, in the writing sub-frame W_f2 (light emission sub-frame L_f1), the OLEDs 130 in all of the pixel circuits 110R, 110G, and 110B emit light with brightness corresponding to the sub-panel pixels 11R, 11G, and 11B of the sub-frame f1, and a projection pixel according to the light emission is visually recognized at the position (1) on the screen Scr.

Operations of the projection device 1 in the writing sub-frame W_f3 are the same as those in the writing sub-frame W_f1 except for the following points.

That is, the operations in the writing sub-frame W_f3 are different from the operations in the writing sub-frame W_f1 in that, first, the video processing circuit 40 outputs input pixels in even-numbered rows and even-numbered columns, among input pixels arranged in (2m) vertical rows by (2n) horizontal columns in the video data Vde-in, as the video data Vdata in the writing sub-frame W_f2, and secondly, the video processing circuit 40 sets the control signal Psh_Y to be at a voltage +A and sets the control signal Psh_X to be at a voltage −A to set the projection pixel of the optical path shift element 20 to be at the position (2). The optical path is shifted to the second optical path, and the state is maintained.

In the writing sub-frame W_f3, in all of the pixel circuits 110R, 110G, and 110B, a voltage of a data signal corresponding to an input pixel in an even-numbered row and an even-numbered column among the input pixels arranged in (2m) vertical rows by (2n) horizontal columns in the video data Vde-in is held in the capacitive element C1a, while a current corresponding to the voltage held in the capacitive element C1b (the voltage written in the sub-frame Wf_2) is supplied to the OLED 130.

Thus, in the writing sub-frame W_f3 (light emission sub-frame L_f2), the OLEDs 130 in all of the pixel circuits 110R, 110G, and 110B emit light with brightness corresponding to the sub-panel pixels 11R, 11G, and 11B of the sub-frame f2, and a projection pixel according to the light emission is visually recognized at the position (2) on the screen Scr.

The operations of the projection device 1 in the writing sub-frame W_f4 are the same as those in the writing sub-frame W_f1 except for the following points.

That is, the operations in the writing sub-frame W_f3 are different from the operations in the writing sub-frame W_f1 in that, first, the video processing circuit 40 outputs input pixels in odd-numbered rows and even-numbered columns, among input pixels arranged in (2m) vertical rows by (2n) horizontal columns in the video data Vde-in, as the video data Vdata in the writing sub-frame W_f4, secondly, the video processing circuit 40 sets the control signal Psh_Y to be at a voltage +A and sets the control signal Psh_X to be at a voltage +A to set the projection pixel of the optical path shift element 20 to be at the position (3), and thirdly, the control circuit 50 sets the selection signal Sel_a to be at an L level and sets the selection signal Sel_b to be at an H level. The optical path is shifted to the third optical path, and the state is maintained.

In the writing sub-frame W_f4, in all of the pixel circuits 110R, 110G, and 110B, a voltage of a data signal corresponding to an input pixel in an odd-numbered row and an even-numbered column among the input pixels arranged in (2m) vertical rows by (2n) horizontal columns in the video data Vde-in is held in the capacitive element C1b, while a current corresponding to the voltage held in the capacitive element C1a (the voltage written in the sub-frame Wf_3) is supplied to the OLED 130.

Thus, in the writing sub-frame W_f4 (light emission sub-frame L_f3), the OLEDs 130 in all of the pixel circuits 110R, 110G, and 110B emit light with brightness corresponding to the sub-panel pixels 11R, 11G, and 11B of the sub-frame f3, and a projection pixel according to the light emission is visually recognized at the position (3) on the screen Scr.

Figure 15:
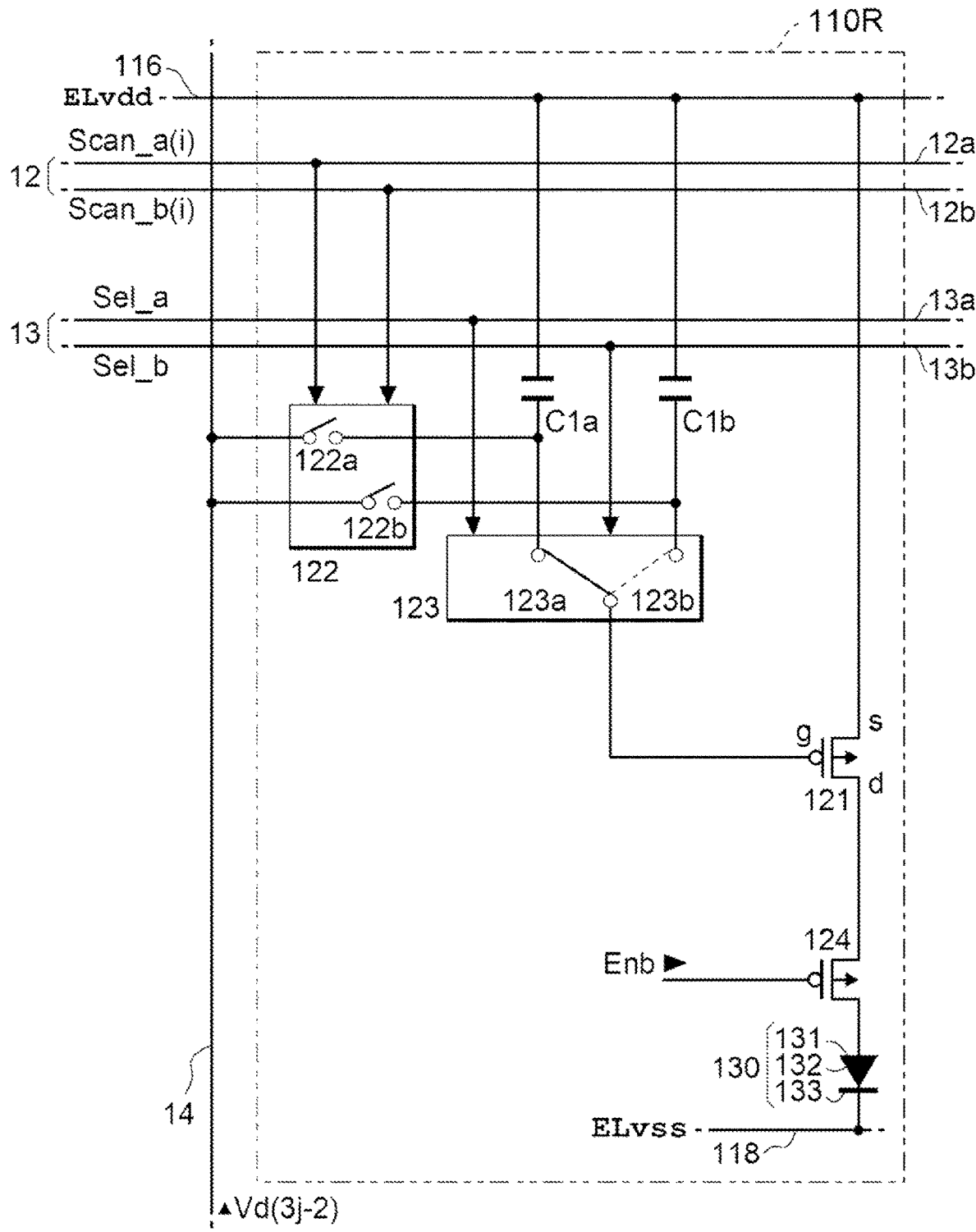
FIG. 15 is an equivalent circuit diagram of a pixel circuit in the first embodiment.

The pixel circuits 110R, 110G, and 110B of the display panel 10 in the projection device 1 according to the first embodiment can be grasped as configurations as illustrated in FIG. 15, for example, when the pixel circuit 110R is taken as an example.

The transistors 122a and 122b in FIG. 11 can be grasped as a first selector 122 as illustrated in FIG. 15. In detail, the first selector 122 electrically connects one end of the capacitive element C1a to the data lines 14 in the (3j−2)-th column when the scanning line 12a is selected and the scanning signal Scan_a(i) is set to be at an L level in the writing sub-frames W_f1 and W_f3, and electrically connects one end of the capacitive element C1b to the data lines 14 in the (3j−2)-th column when the scanning line 12b is selected and the scanning signal Scan_b(i) is set to be at an L level in the writing sub-frames W_f2 and W_f4.

Further, the transistors 123a and 123b in FIG. 11 can be grasped as a second selector 123 as illustrated in FIG. 15. In detail, the second selector 123 electrically connects one end of the capacitive element C1b to the gate node g of the transistor 121 when the selection signal Sel_a is set to be at an H level and the selection signal Sel_b is set to be at an L level in the writing sub-frames W_f1 and W_f3, and electrically connects one end of the capacitive element C1a to the gate node g of the transistor 121 when the selection signal Sel_a is set to be at an L level and the selection signal Sel_b is set to be at an H level in the writing sub-frames W_f2 and W_f4.

That is, the transistor 121 is an example of a drive transistor, the transistor 122a is an example of a first switching element, the transistor 122b is an example of a second switching element, the transistor 123a is an example of a third switching element, and the transistor 123b is an example of a fourth switching element. In addition, the capacitive element C1a is an example of a first capacitive element, and the capacitive element C1b is an example of a second capacitive element.

Next, a point that degradation of display quality is suppressed in an image projected by the projection device 1 according to the present embodiment will be described.

Figure 16:
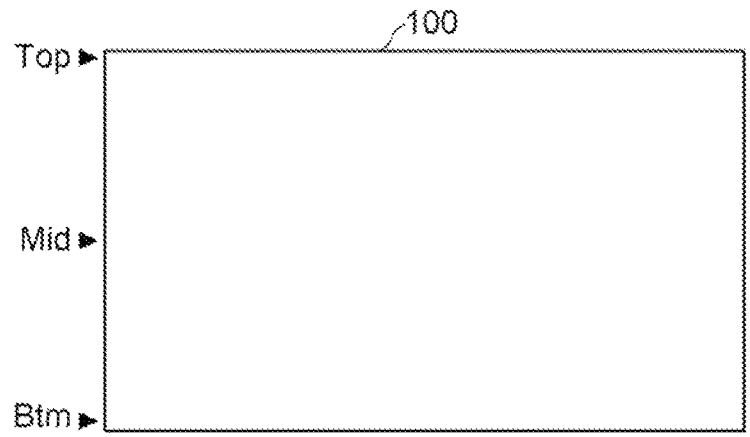
FIG. 16 is a diagram illustrating a projection image.

FIG. 16 is a diagram illustrating the display region 100. "Top" represents an upper end of the display region 100, that is, a first row, "Mid" represents the middle of the display region 100, that is, a (m/2)-th row, and "Btm" represents a lower end of the display region 100, that is, an m-th row.

Figure 27:
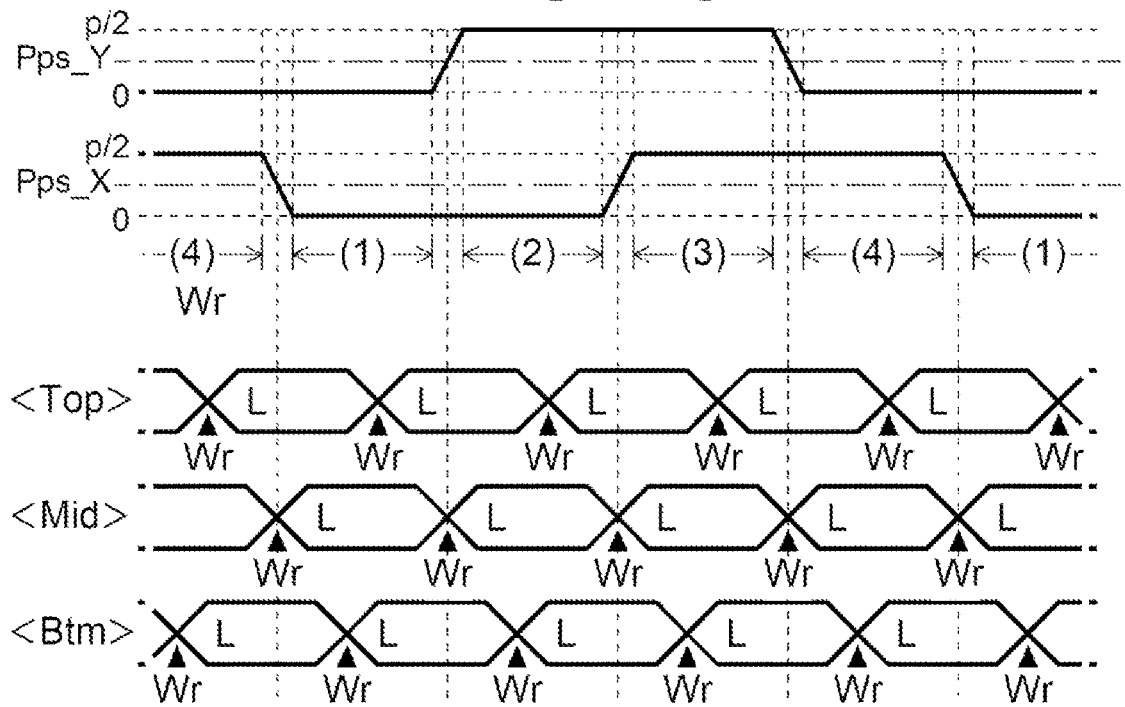
FIG. 27 is a timing chart illustrating operations of a display panel according to a first comparative example.

FIG. 27 is a diagram illustrating degradation of display quality in a first comparative example. In the first comparative example, line-sequential driving in which a scanning line is selected for each horizontal scanning period H, a data signal is written, and brightness corresponding to the written data signal is obtained is described.

Note that "Wr" indicates a write timing of a data signal, and "L" indicates the state of brightness corresponding to the written data signal.

In the first comparative example, when the optical path shift element is configured to shift the optical path at a writing timing of the middle Mid of the display region 100, the panel pixel at the middle Mid is visually recognized with the brightness of the sub-frame at the position shifted by the shift element, but the panel pixels at the upper end Top and the lower end Btm are visually recognized with brightness over the preceding and succeeding sub-frames at the position shifted by the optical path shift element.

For this reason, in the first comparative example, the panel pixels positioned at the upper end Top and the lower end Btm are not correctly visually recognized at the position shifted by the optical path shift element, and thus the display quality is degraded due to the inconsistency of display at the shifted position.

Figure 28:
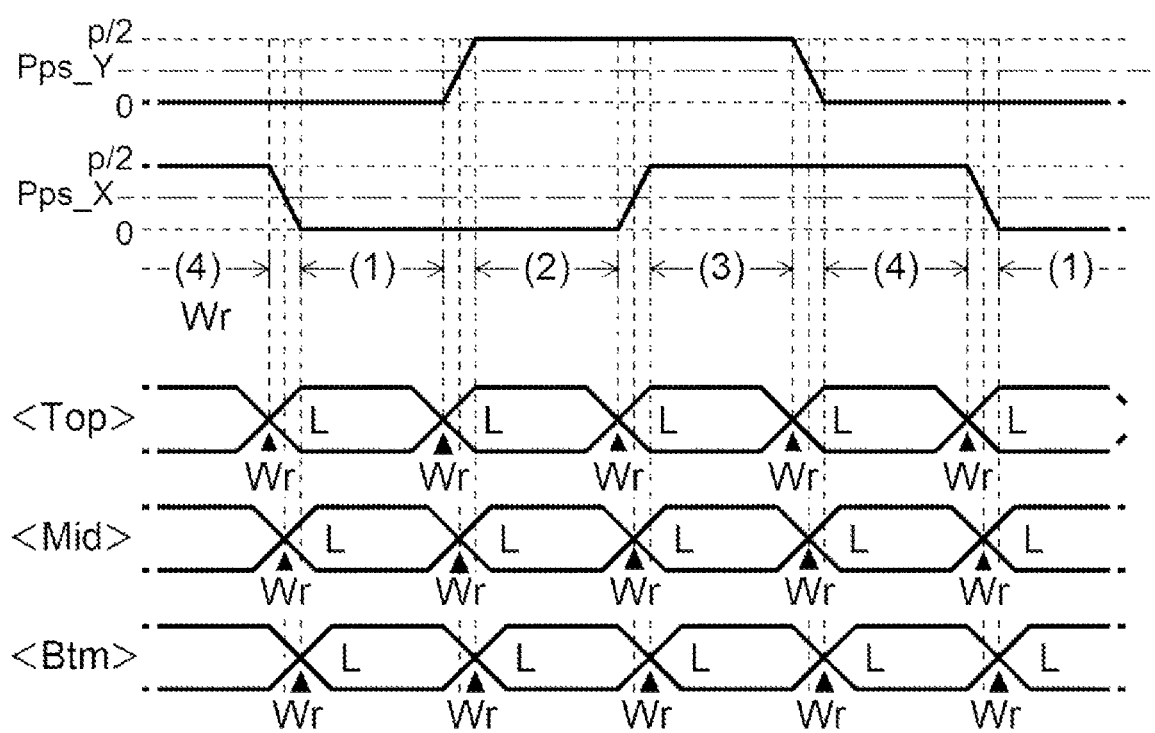
FIG. 28 is a timing chart illustrating operations of a display panel according to a second comparative example.

FIG. 28 is a diagram illustrating degradation of display quality in a second comparative example. The second comparative example has a configuration in which the horizontal scanning period H is shortened, that is, a period of time for writing a data signal is shortened, the vertical scanning blanking period is extended accordingly, and the extended vertical scanning blanking period is matched to a period in which a position shifted by the optical path shift element is stabilized.

In the second comparative example, since the panel pixels at the upper end Top, the middle Mid, and the lower end Btm are visually recognized substantially equally at the position shifted by the optical path shift element as in the first comparative example, it is considered that degradation of display quality due to the inconsistency of display at the shifted position is suppressed.

However, in the second comparative example, since a period of time for writing a data signal is shortened, a situation in which the voltage of the data signal is not sufficiently written to a capacitive element occurs, and thus display quality is likely to be degraded due to insufficient writing.

Figure 17:
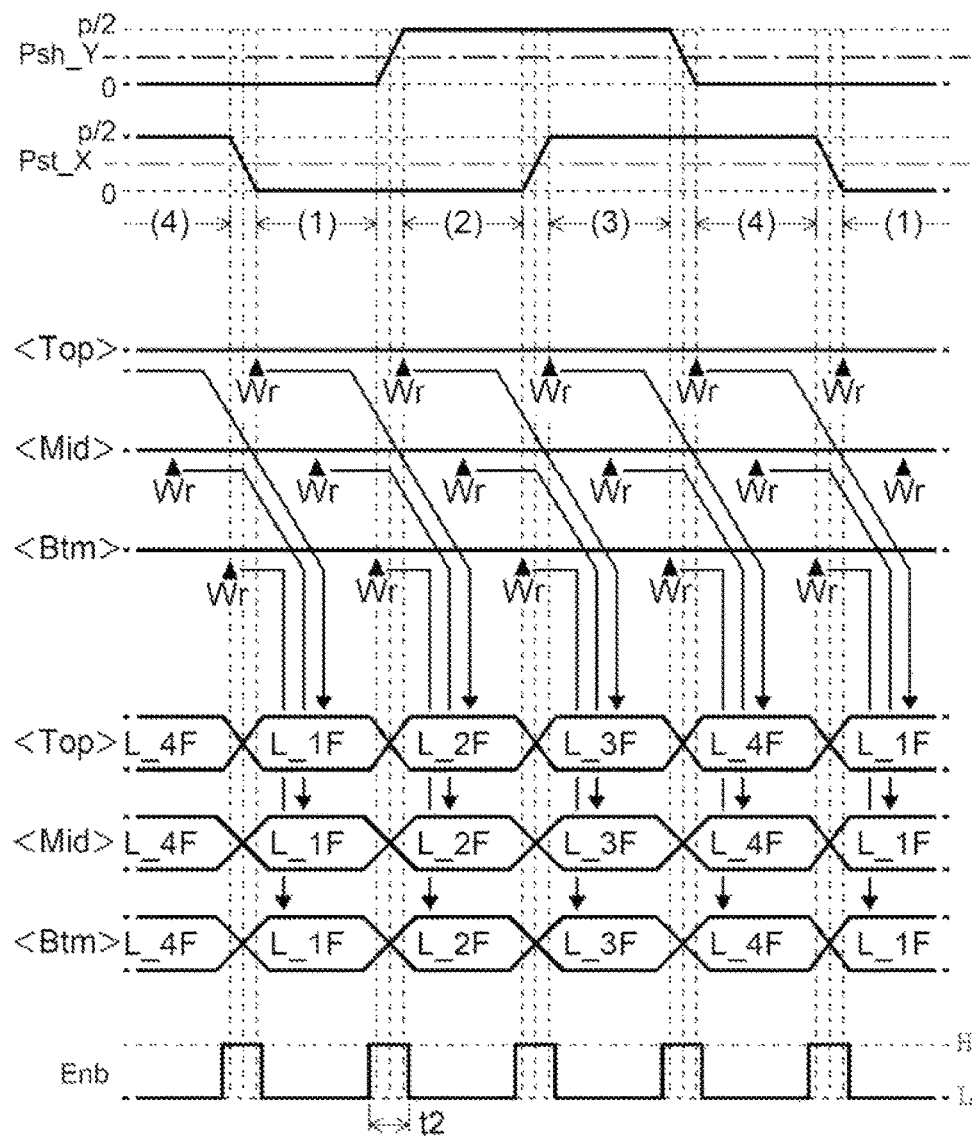
FIG. 17 is a diagram illustrating an improvement in display quality according to the embodiment.

FIG. 17 is a diagram illustrating a point that degradation of display quality is suppressed in the first embodiment.

As described above, in the first embodiment, for example, data signals are sequentially written to the capacitive element C1a for each horizontal scanning period H in the writing sub-frame W_f1, while a current corresponding to voltages written to the capacitive element C1b are simultaneously supplied to the OLED 130. Data signals are sequentially written to the capacitive element C1b for each horizontal scanning period H in the next writing sub-frame W_f2, while currents corresponding to voltages written to the capacitive element C1a are simultaneously supplied to the OLED 130.

For this reason, in the first embodiment, a period of time for writing a data signal is sufficiently secured, and the inconsistency of display at a shifted position does not occur, thereby suppressing degradation of display quality.

Second Embodiment

Next, a projection device 1 according to a second embodiment will be described. The second embodiment is different from the first embodiment in terms of configurations of pixel circuits 110R, 110G, and 110B in a display panel 10. Consequently, in the second embodiment, differences from the pixel circuits 110R, 110G, and 110B will be mainly described.

Note that, in the second embodiment, the pixel circuits 110R, 110G, and 110B are configured such that a threshold voltage of a transistor 121 that controls a current flowing through an OLED 130 is compensated for.

Further, in the second embodiment, since the pixel circuits 110R, 110G, and 110B have the same electrical configuration, the pixel circuit 110R positioned in an i-th row and a (3j−2)-th column will be described as a representative.

Figure 18:
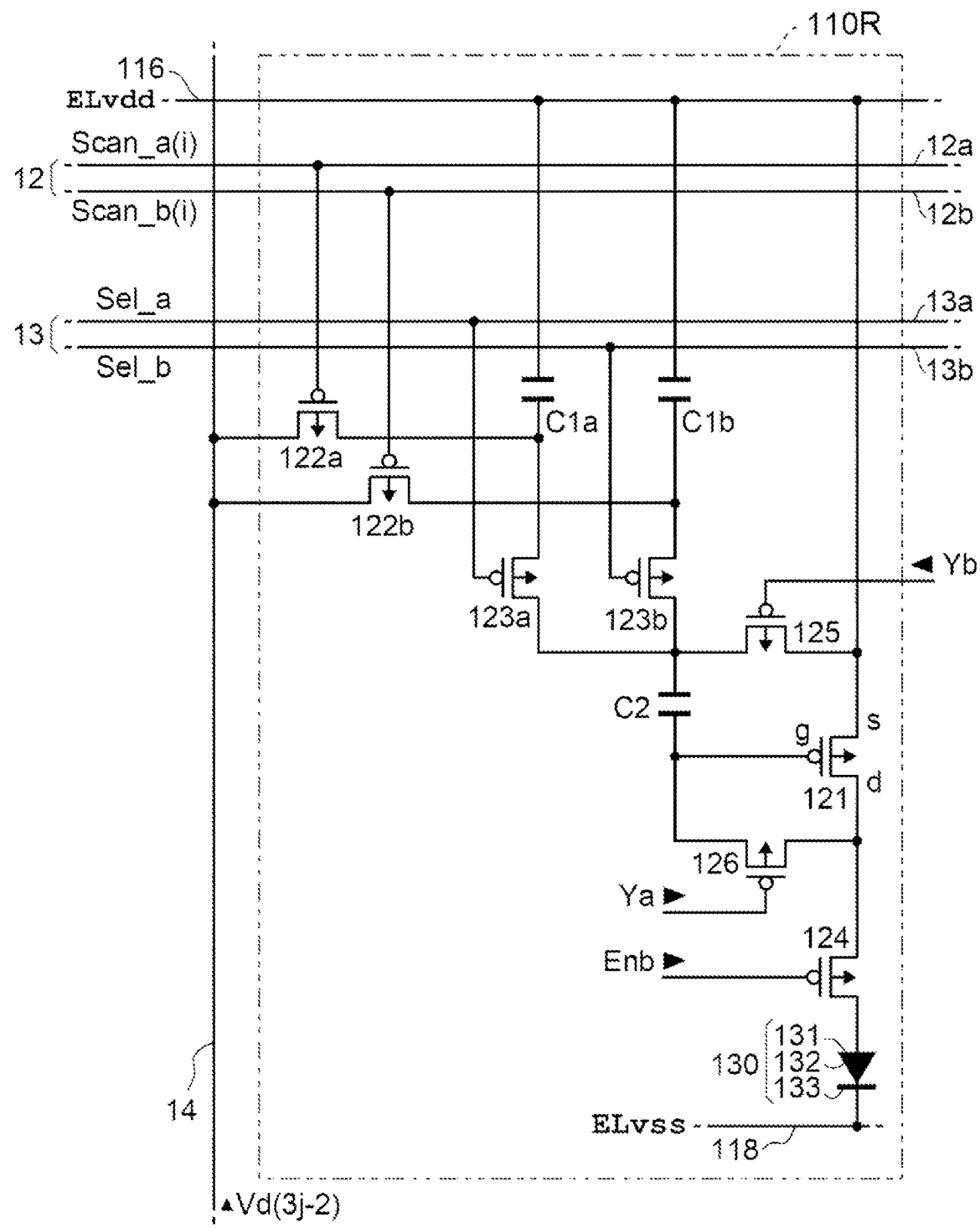
FIG. 18 is a diagram illustrating a pixel circuit of a display panel according to a second embodiment.

FIG. 18 is a circuit diagram illustrating an electrical configuration of the pixel circuit 110R in the display panel 10 of the projection device 1 according to the second embodiment. In the pixel circuit 110R illustrated in FIG. 18, a capacitive element C2 and p-channel MOS type transistors 125 and 126 are added to the pixel circuit 110R illustrated in FIG. 11. In FIG. 18, a drain node of a transistor 123a and a drain node of the transistor 123b are coupled to a drain node of the transistor 125 and one end of a capacitive element C2. The other end of the capacitive element C2 is coupled to a gate node g of the transistor 121 and a drain node of the transistor 126. In the transistor 125, a source node is coupled to a power supply wiring 116, and a control signal Yb is supplied to the gate node. In the transistor 126, a source node is coupled to a drain node d of the transistor 121, and a control signal Ya is supplied to the gate node.

The control signals Ya and Yb are supplied from a control circuit 50 to all of the pixel circuits 110R, 110G, and 110B in common.

Figure 19:
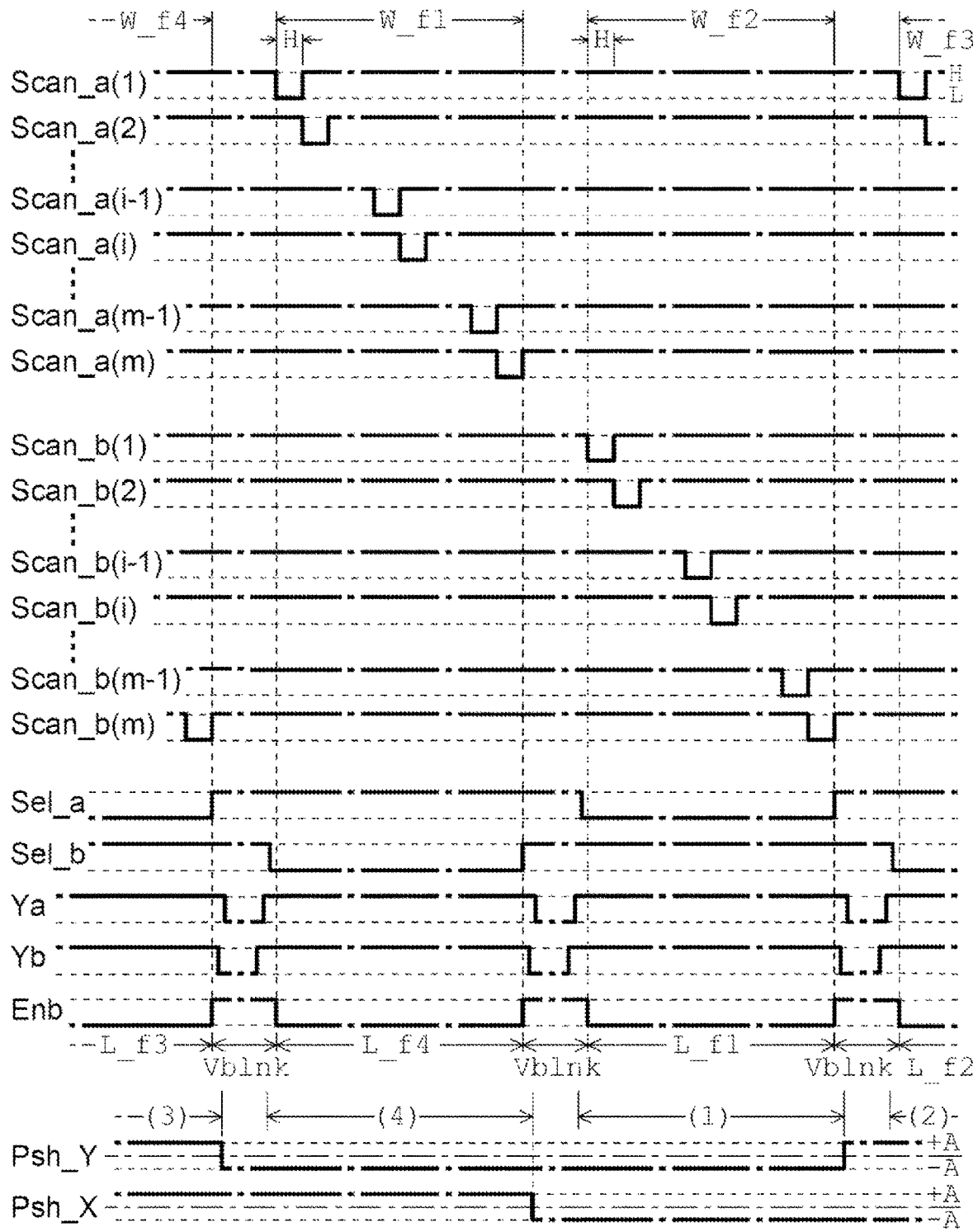
Figure 20:
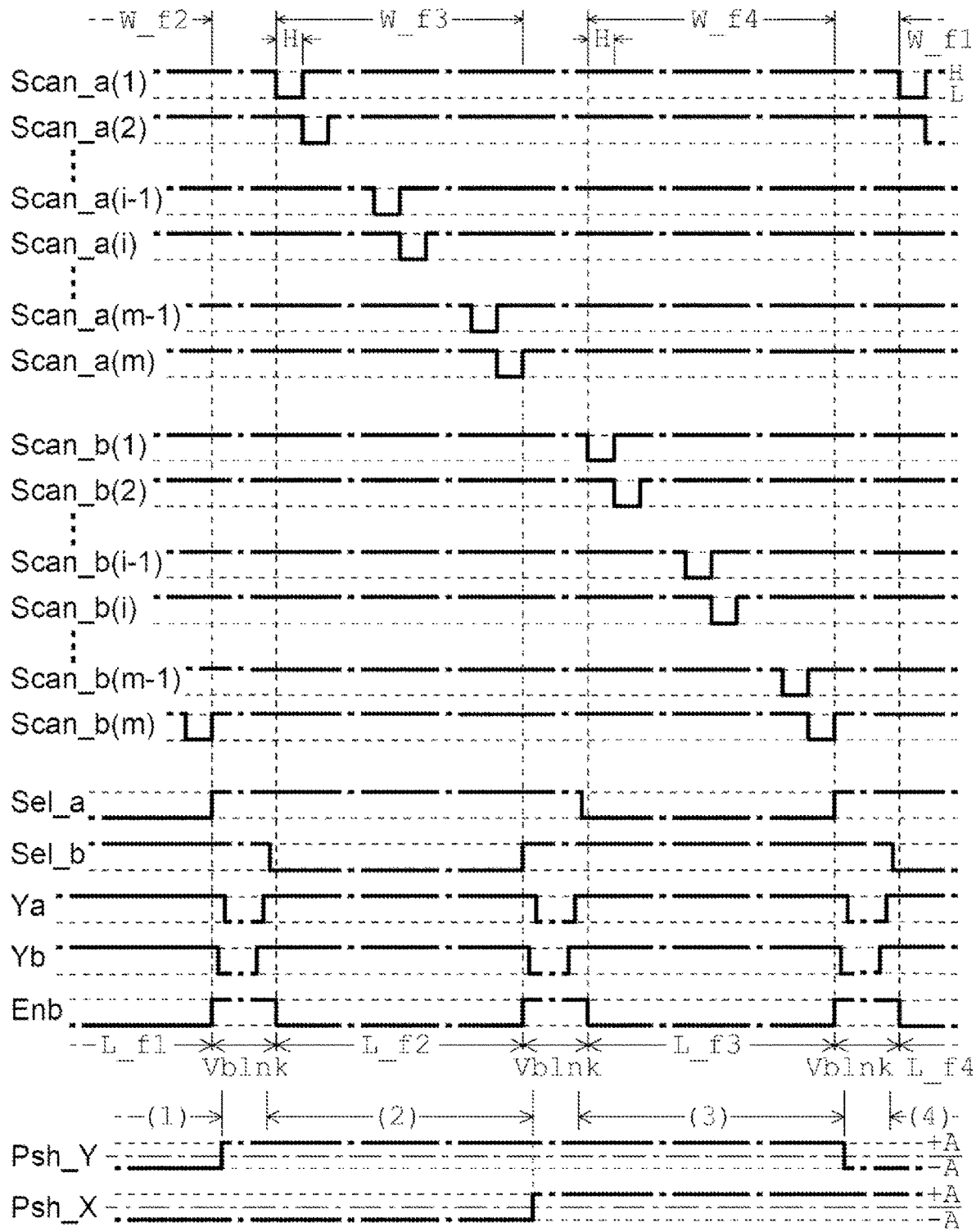

FIGS. 19 and 20 are timing charts illustrating operations of the projection device 1 according to the second embodiment.

The control signals Ya and Yb are set to be at an L level after writing sub-frames W_f1 to W_f4 end. In detail, after the writing sub-frames W_f1 to W_f4 end, the control signal Yb is set to be at an L level first in terms of time, and then the control signal Ya is set to be at an L level. After the control signal Ya is set to be at an L level, the control signal Yb is set to be at an H level first, and then the control signal Ya is set to be at an L level.

Further, in the second embodiment, a selection signal Sel_a is set to be at an H level and a selection signal Sel_b is set to be at an L level in the writing sub-frames W_f1 and W_f3 (light emission sub-frames L_f4 and L_f2), and the selection signal Sel_a is set to be at an L level and the selection signal Sel_b is set to be at an H level in the writing sub-frames W_f2 and W_f4 (the light emission sub-frames L_f1 and L_f3), which is the same as in the first embodiment. However, a timing at which the selection signals Sel_a and Sel_b change to an H level is an end timing of the writing sub-frames W_f1 to W_f4 (light emission sub-frames L_f1 to L_f4). In addition, a timing at which the selection signals Sel_a and Sel_b change to an L level is after the control signal Ya changes to an H level and before the vertical scanning blanking period Vblnk ends.

When the control signal Yb is set to be at an L level at the end timings of the writing sub-frames W_f1 to W_f4, the transistor 125 is set to be in an ON state, and thus one end of the capacitive element C2 is set to be at a power supply potential ELVdd.

Next, when the control signal Ya is set to be at an L level, the transistor 126 is set to be in an ON state, and thus a state where the drain node and the gate node are coupled to each other in the transistor 121, that is, a diode-coupled state, is set. For this reason, a voltage between the gate node g and the source node s in the transistor 121 converges to a threshold voltage of the transistor 121, and the threshold voltage is held in the capacitive element C2.

When the control signal Yb is set to be at an H level, the transistor 125 is set to be in an OFF state, and when the control signal Ya is set to be at an H level, the transistor 126 is set to be in an OFF state.

Since the selection signal Sel_b is set to be at an L level immediately before the vertical scanning blanking period Vblnk ends, and the transistor 123b is set to be in an ON state, the capacitive elements C1b and C2 are set to be in a series state between the power supply wiring 116 and the gate node g of the transistor 121.

For this reason, in the light emission sub-frame L_f2 (or L_f4) after the vertical scanning blanking period Vblnk ends, a threshold voltage is added to a voltage corresponding to a gradation level supplied in the previous writing sub-frame W_f2 (or W_f4), and the added voltage is applied to the gate node g of the transistor 121.

In addition, when the light emission sub-frame L_f3 (or L_f1) comes after the vertical scanning blanking period Vblnk ends, the transistor 123a is set to be in an ON state, and thus the capacitive elements C1a and C2 are set to be in a series state between the power supply wiring 116 and the gate node g of the transistor 121. For this reason, in the light emission sub-frame L_f3 (or L_f1), a threshold voltage is added to a voltage corresponding to a gradation level supplied in the previous writing sub-frame W_f3 (or W_f1), and the added voltage is applied to the gate node g of the transistor 121.

In this manner, according to the second embodiment, the threshold voltage of the transistor 121 is held in the capacitive element C2 in each vertical scanning blanking period Vblnk.

In the subsequent light emission sub-frame, when the transistor 123b is set to be in an ON state, a threshold voltage (a voltage held in the capacitive element C2) is added to a voltage (a voltage held in the capacitive element C1b) corresponding to a gradation level supplied in the previous writing sub-frame, and the added voltage is applied to the gate node g of the transistor 121. On the other hand, when the transistor 122a is set to be in an ON state, a voltage corresponding to a gradation level is held in the capacitive element C1a.

On the other hand, in the light emission sub-frame after the vertical scanning blanking period Vblnk, an operation is executed in which, when the transistor 123a is set to be in an ON state, a threshold voltage (a voltage held in the capacitive element C2) is added to a voltage (a voltage held in the capacitive element C1a) corresponding to a gradation level supplied in the previous writing sub-frame, and the added voltage is applied to the gate node g of the transistor 121, while when the transistor 122*b* is set to be in an ON state, a voltage corresponding to a gradation level is held in the capacitive element C1*b*.

In the second embodiment, such operations are alternately repeated.

In the second embodiment, in the light emission sub-frames L_f1 to L_f4, the transistors 121 of all of the pixel circuits 110R, 110G, and 110B simultaneously apply a current to the OLED 130 in a state where the position of the projection pixel is stabilized, which is the same as in the first embodiment.

Further, according to the second embodiment, in any of the light emission sub-frames L_f1 to L_f4, the transistor 121 applies a current corresponding to a gradation level to the OLED 130 in a state where a threshold voltage is compensated for, and thus it is possible to perform high-quality display with little variation for each of the pixel circuits 110R, 110G, and 110B. For this reason, in the second embodiment, a period of time for writing a data signal is sufficiently secured, and the inconsistency of display at a shifted position does not occur, whereby degradation of display quality is suppressed, and it is possible to perform high-quality display in which a threshold voltage is compensated for.

Figure 21:
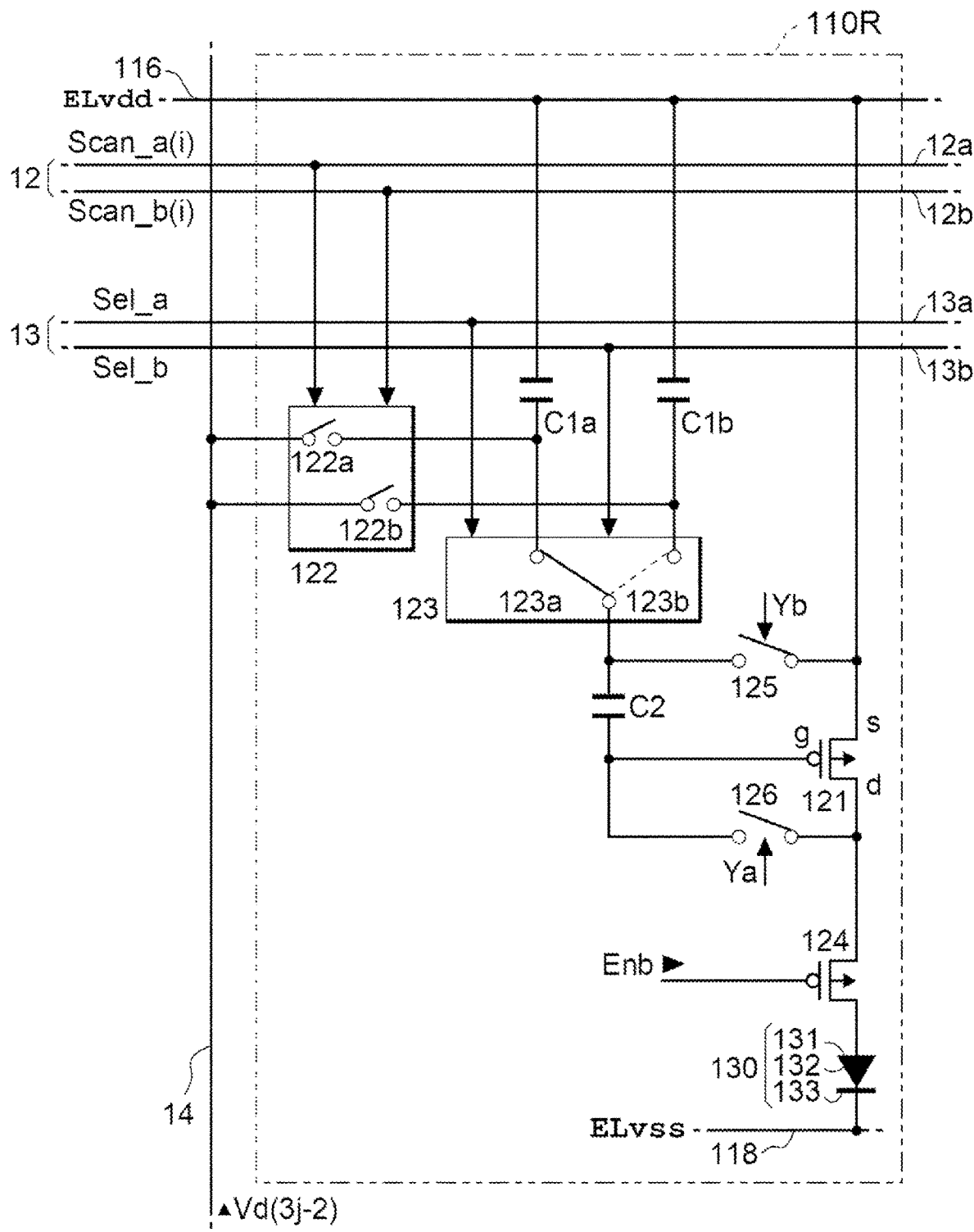
FIG. 21 is an equivalent circuit diagram of a pixel circuit in the second embodiment.

The pixel circuits 110R, 110G, and 110B of the display panel 10 in the projection device 1 according to the second embodiment can be grasped as configurations as illustrated in FIG. 21, for example, when the pixel circuit 110R is taken as an example.

As illustrated in FIG. 16, when the control signal Ya is set to be at an L level in the vertical scanning blanking period Vblnk, the transistor 126 in FIG. 21 functions as a switching element that electrically short-circuits the gate node g and the drain node d of the transistor 121 to bring the transistor 121 into a diode-coupled state. That is, the transistor 126 is an example of a sixth switching element.

In addition, the capacitive element C2 holds the threshold voltage of the transistor 121 when the transistors 125 and 126 are set to be in an ON state. In addition, the capacitive element C2 holding the threshold voltage is electrically interposed between one end of the capacitive element C1*b* and the gate node g of the transistor 121 when the selection signal Sel_a is set to be at an H level and the selection signal Sel_b is set to be at an L level in the light emission sub-frame L_f2 (or L_f4), and is electrically interposed between one end of the capacitive element C1*a* and the gate node g of the transistor 121 when the selection signal Sel_a is set to be at an L level and the selection signal Sel_b is set to be at an H level in the light emission sub-frame L_f1 (or L_f3). That is, the capacitive element C2 is an example of a third capacitive element.

Note that, in the present description, "being electrically interposed" means being inserted between two or more elements when viewed in an electric circuit.

Third Embodiment

Next, a projection device 1 according to a third embodiment will be described. The third embodiment is different from the first or second embodiment in terms of the arrangement of sub-panel pixels in a display panel 10.

Figure 22:
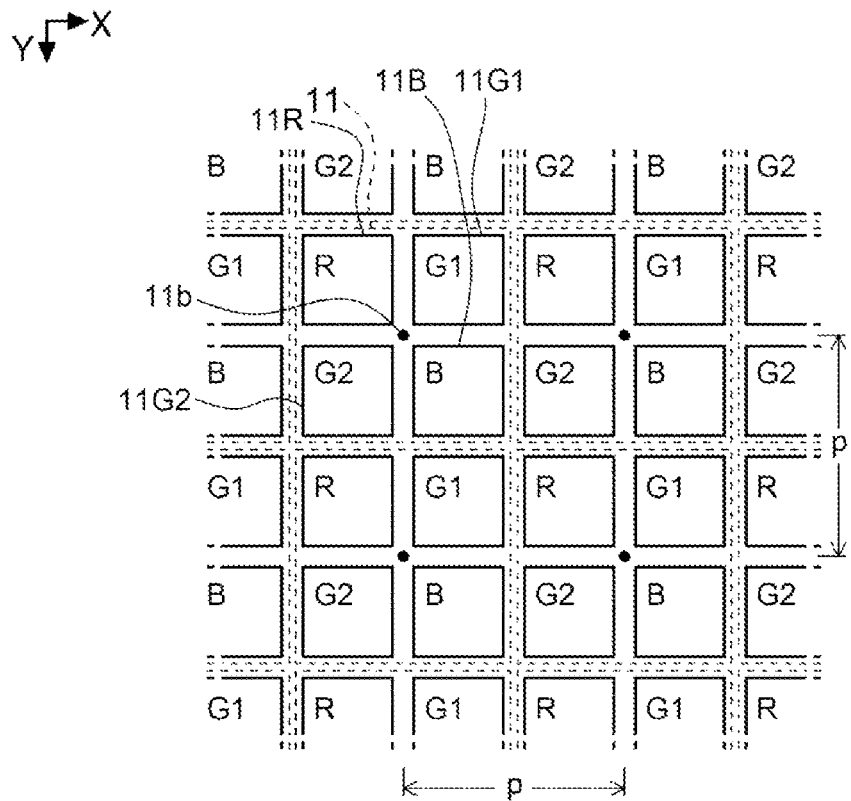
FIG. 22 is an example of panel pixels and sub-panel pixels in a projection device according to a third embodiment.

FIG. 22 is a diagram illustrating a configuration of a panel pixel 11 of the display panel 10 in the third embodiment. As illustrated in the drawing, in the third embodiment, a green sub-panel pixel is divided into two parts in the panel pixel 11. In detail, the panel pixel 11 is constituted by a total of four sub-panel pixels, that is, one red sub-panel pixel 11R, two green sub-panel pixels 11G1 and 11G2, and one blue sub-panel pixel 11B. These four sub-panel pixels are arranged in a square array of 2 wide by 2 long, and the green sub-panel pixels 11G2 and 11G2 are diagonally positioned in the square array of 2×2, the red sub-panel pixel 11R is positioned in one of the remaining two pixels, and the blue sub-panel pixel 11B is positioned in the other one of the remaining two pixels.

Note that, in such an arrangement of the sub-panel pixels 11R, 11G1, 11G2, and 11B, the center of gravity 11*b* of the panel pixel 11 is the center of a diagonal line in the square array of 2×2. In such an arrangement, colors of sub-panel pixels adjacent to each other in the X or Y-direction are necessarily different from each other. For this reason, since the color filters of the same color are not adjacent to each other in the X or Y-direction, it is possible to reduce a difference in characteristic of a viewing angle between the red, green, and blue sub-panel pixels.

Although not illustrated in the drawing, a pixel electrode 131 is shared by the sub-panel pixels 11G1 and 11G2. For this reason, when the pixel electrode 131 shared by the sub-panel pixels 11G1 and 11G2 is brought into contact with the data lines 14 in the vicinity of the center of gravity 11*b*, the arrangement of the data lines 14 is the same as that in the first embodiment illustrated in FIG. 10.

Thus, as illustrated in FIGS. 8 and 9, in the third embodiment, for example, when projection is performed at a position (1) in a sub-frame f1, at a position (2) in a sub-frame f2, at a position (3) in a sub-frame f3, and at a position (4) in a sub-frame f4, the center of gravity 11*b* of the panel pixel 11 is sequentially shifted by half of a pitch p. For this reason, when viewed from the sub-frame f1 to the sub-frame f4, the center of gravity 11*b* is shifted by a half pitch p/2 in each of the Y-direction and the X-direction, and thus a resolution is set to four times in a pseudo manner.

Note that, in the third embodiment, one of the sub-panel pixels 11G1 and 11G2 may be replaced with a sub-panel pixel of a color different from red, green, and blue, for example, a white sub-panel pixel to express high brightness, or may be replaced with a yellow sub-panel pixel to expand a reproducible color gamut.

Fourth Embodiment

Next, a projection device 1A according to a fourth embodiment will be described. The projection devices according to the first to third embodiments are of a so-called single panel type in which the red sub-panel pixel 11R, the green sub-panel pixel 11G (G1, G2), and the blue sub-panel pixel 11B are provided in the display panel 10. On the other hand, the projection device according to the fourth embodiment is a so-called three-panel type in which display panels 10 are provided for red, green, and blue colors, respectively, and images of these colors are synthesized and output.

Figure 23:
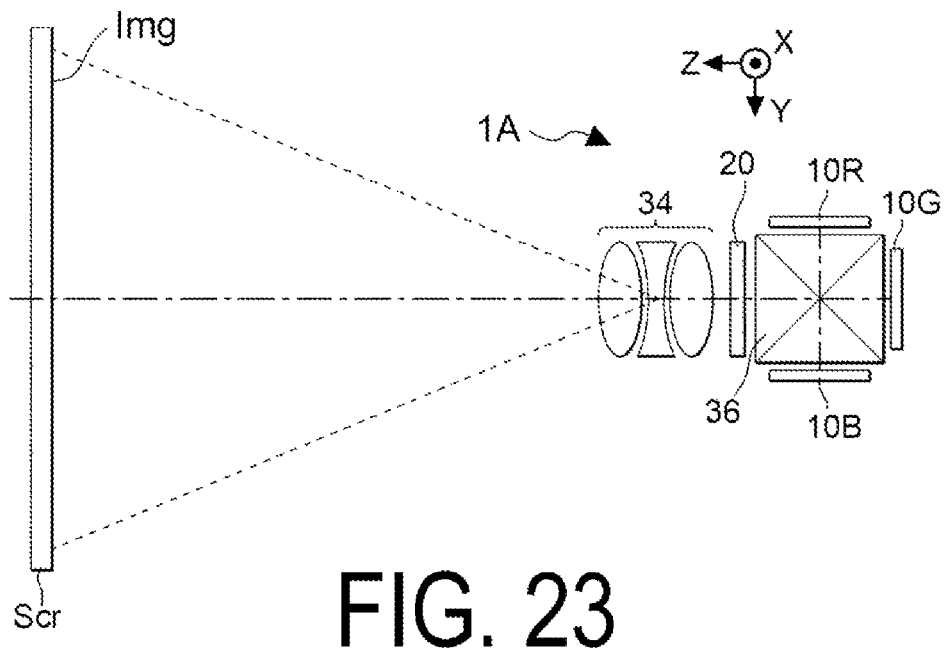
FIG. 23 is a diagram illustrating a configuration of a projection device according to a fourth embodiment.

FIG. 23 is a diagram illustrating a configuration of the projection device 1A according to the third embodiment. In the drawing, a display panel 10R emits a modulated image of a red component in the direction of 6 o'clock in the drawing. A display panel 10G emits a modulated image of a green component in the direction of 9 o'clock in the drawing. A display panel 10B emits a modulated image of a blue component in the direction of 12 o'clock in the drawing.

A dichroic prism 36 reflects the modulated image of the red component obtained by the display panel 10R in the direction of 9 o'clock in the drawing, transmits the modulated image of the green component obtained by the display panel 10G in the direction of 9 o'clock in the drawing, and reflects the modulated image of the blue component obtained by the display panel 10B in the direction of 9 o'clock in the drawing.

Thereby, in the dichroic prism 36, the modulated image of the red component, the modulated image of the green component, and the modulated image of the blue component are synthesized and emitted in the direction of 9 o'clock (Z-direction) in the drawing. An optical path shift element 20 can shift light synthesized by the dichroic prism 36 under the control of a video processing circuit 40.

Figure 24:
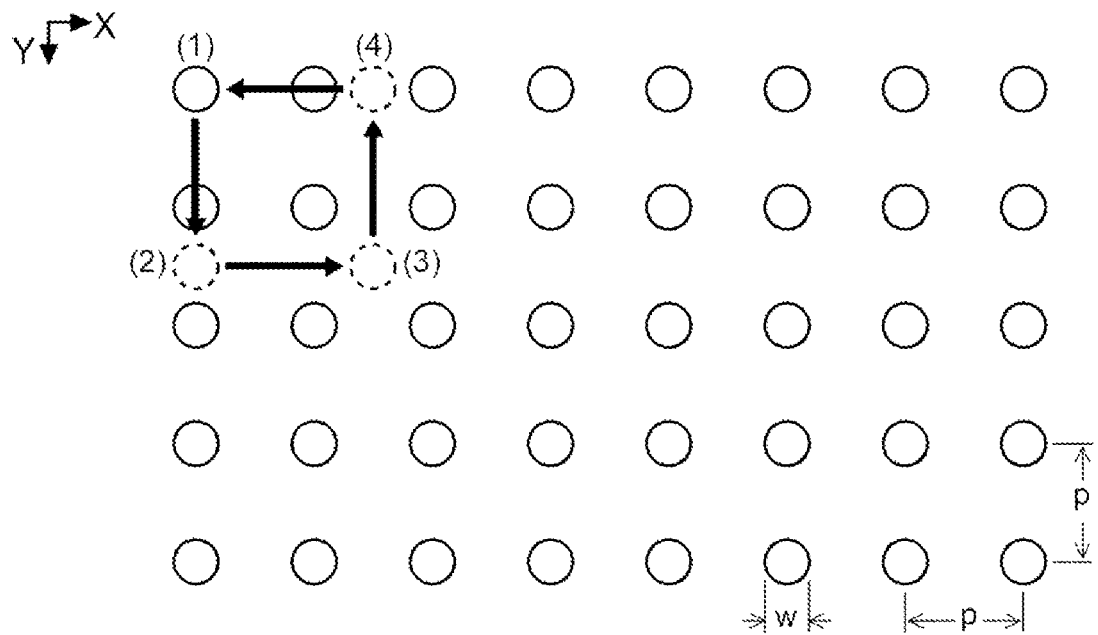
FIG. 24 is a diagram illustrating projection pixels obtained by the projection device.
Figure 25:
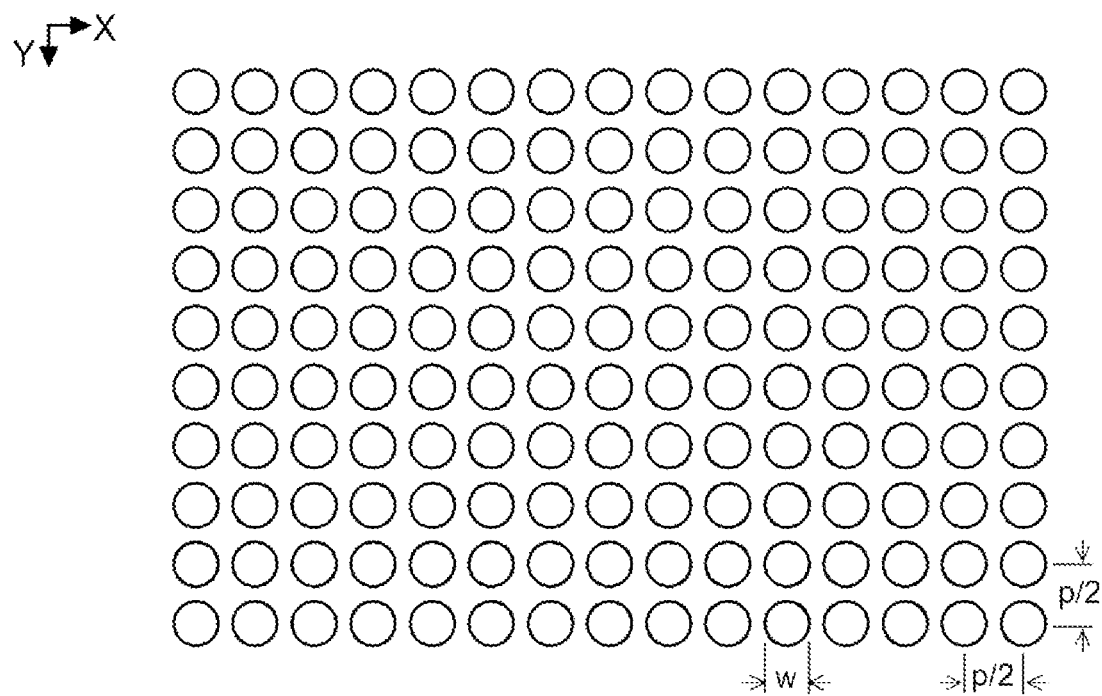
FIG. 25 is a diagram illustrating projection pixels visually recognized in one frame F.

FIG. 24 is a diagram illustrating the arrangement of projection pixels when the projection pixels are projected, for example, at the position (1) by the optical path shift element 20. In the fourth embodiment, since the sub-panel pixels of the respective colors are synthesized to form a projection pixel, there is no concept of the center of gravity 11b as in the first to third embodiments, and one color is represented by one projection pixel itself indicated by a circle in the drawing. In FIG. 24, the width (maximum diameter) of a projection pixel is denoted by W. Note that, in FIG. 24, a state where the projection pixels are shifted to the positions (2) to (4) is partially indicated by arrows. FIG. 25 illustrates the state of the projection pixels which are projected at the positions (1) to (4) in one frame F and visually recognized.

In the examples illustrated in FIGS. 24 and 25, k is set to "1", and a shift amount is set to ³⁄₂ times a pitch p in the fourth embodiment. Thus, in the fourth embodiment, when the projection pixel is projected at the position (1) in a sub-frame f1, at the position (2) in a sub-frame f2, at the position (3) in a sub-frame f3, and at the position (4) in a sub-frame f4, the projection pixel is sequentially shifted by ³⁄₂ times the pitch p. For this reason, when viewed from the sub-frame f1 to the sub-frame f4, the projection pixels are consequently arranged at a half pitch p/2 in each of the Y-direction and the X-direction, and thus a resolution is set to four times in a pseudo manner.

In addition, when the pitch p/2 of the projection pixels arranged in a pseudo manner by shifting is made smaller than a maximum diameter w of the projection pixel, the projection pixels arranged in a pseudo manner do not overlap each other. For this reason, a clear image without overlapping can be visually recognized in a pseudo manner.

In the examples of FIGS. 24 and 25, k is set to "1", and a shift amount is set to ³⁄₂ times the pitch p, but k may be set to "0", and a shift amount may be set to ½ times the pitch p. Further, k may be set to "2", "3", "4", . . . , and a shift amount may be set to ⁵⁄₂ times, ⁷⁄₂ times, ⁹⁄₂ times, . . . , the pitch p. That is, k may be an integer equal to or greater than "0" as described above.

APPLICATION EXAMPLE AND MODIFICATION EXAMPLE

The first and second embodiments (hereinafter referred to as embodiments and the like) exemplified above can be variously modified. Specific modification aspects that may be applied to the embodiments are exemplified below. Two or more embodiments arbitrarily selected from the following examples may be combined to the extent that mutual contradiction does not arise.

In the embodiments and the like, a configuration has been adopted in which a period in which the scanning signals Scan_a(1) to Scan_a(m) are sequentially set to be at an L level and a period in which the scanning signals Scan_b(1) to Scan_b(m) are sequentially set to be at an L level, that is, the entire vertical effective scanning period, are set as a light emission period, and the control signal Enb is set to be at an L level, that is, the OLED 130 emits light.

The present disclosure is not limited to such a configuration, and a configuration in which a light emission period in which the control signal Enb is set to be at an L level is reduced to shorten a light emission period of the OLED 130 may be adopted. With such a configuration, when the light emission period of the OLED 130 is shortened, the display characteristics of the display panel 10 become close to a so-called impulse response, and thus a sense of afterimage in the display of a moving image is reduced. In addition, a dark gradation level can be expressed more darkly in the pixel circuit 110.

Note that, when a portion of the vertical effective scanning period is set as a light emission period, the light emission period may be shifted forward in time, may be shifted backward in time, or may be intermittent.

Figure 26:
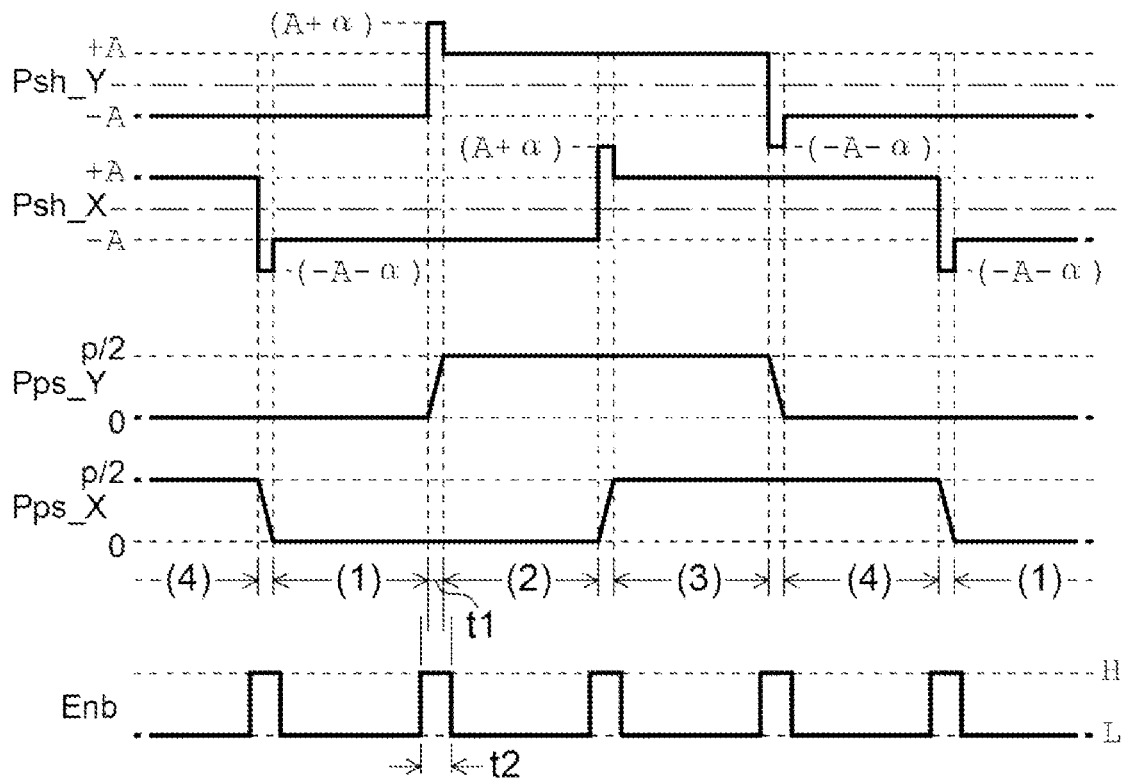
FIG. 26 is a timing chart illustrating control signals and the like of an optical path shift element according to a modification example.

In order to increase the responsiveness of the shift of the optical path, the optical path shift element 20 may be driven by overdriving. Specifically, as illustrated in FIG. 26, when the video processing circuit 40 changes the voltages of the control signals Psh_Y and Psh_X, the video processing circuit 40 sets the voltages to be voltages excessively shifted in the direction of the change, and then immediately sets the voltages to be voltages corresponding to a shift amount.

For example, when a projection pixel is changed from the position (1) to the position (2), the video processing circuit 40 sets the voltage of the control signal Psh_Y to be a voltage (A+α) excessively shifted by α in the direction of the change, and then immediately sets the voltage to be a voltage +A. In addition, for example, when a projection pixel is changed from the position (4) to the position (1), the video processing circuit 40 sets the voltage of the control signal Psh_X to be a voltage (−A−α) excessively shifted by α in the direction of the change and then immediately sets the voltage to be a voltage −A.

When the optical path shift element 20 is driven by overdriving in this manner, the responsiveness of the shift of the optical path is increased, and thus a period in which the projection pixel is stabilized at any one of the positions (1) to (4) is extended. For this reason, it is possible to secure long periods of the light emission sub-frames L_f1 to L_f4.

In the embodiments and the like, the optical path shift element 20 is configured to shift the projection pixels in the X and Y-directions, but may be configured to shift the projection pixels in a direction along either the X-axis or the Y-axis. For example, in a configuration in which the projection pixels are shifted with a shift amount of {k+(p/2)} in the P/2)} to be shifted at two different positions, the resolution of the display panel 10 is increased to two times in the horizontal direction in a pseudo manner and is visually recognized.

In addition, a configuration in which the optical path is shifted not in the X-direction or the Y-direction but in an oblique direction may be adopted.

The arrangement of sub-panel pixels is not limited to the arrangements illustrated in FIGS. 3 and 22, and may be, for example, a delta arrangement in which red, green, and blue sub-panel pixels are arranged in a triangular shape. Even in the delta arrangement, the resolution can be increased in a pseudo manner by shifting the optical path with a shift amount of {k+(p/2)}. Alternatively, the locus of the shift may have a triangular shape.

In the display panels 10 according to the embodiments and the like, the transistor 124 is provided between the transistor 121 and the OLED 130, but a position at which the transistor 124 is provided is not limited to the above-described position. Since the transistor 124 has a function of cutting off a path through which a current controlled by the transistor 121 flows to the OLED 130, a configuration in which the transistors 121 and 124 are coupled in series between the power supply wirings 116 and 118 may be adopted. Note that the transistor 124 is an example of a fifth switching element.

Further, the display panel 10 is configured such that the transistor 124 is provided in the pixel circuits 110R, 110G, and 110B, and the transistor 121 makes a current flow to the OLED 130 by the transistor 124 being set to be in an ON state. However, in the first embodiment, the display panel 10 may be configured such that a light emission period is common to all of the OLEDs 130, and thus, for example, a power supply circuit, which is not illustrated in the drawing, supplies a power supply potential ELVdd to be supplied to the power supply wiring 116 in accordance with the light emission period.

In the embodiments and the like, the OLED 130 has been described as an example of a light emitting element, but other light emitting elements may be used. For example, a light emitting diode (LED), a mini-LED, a micro-LED, or the like may be used as the light emitting element.

The channel types of the transistors 121, 122a, 122b, 123a, 123b, 124, 125, and 126 are not limited to the embodiments and the like. In addition, these transistors may be appropriately replaced with transmission gates except for the transistor 121.

Appendices

Preferred aspects of the present disclosure are understood from the above description, as follows. In the following, in order to facilitate understanding of each of the aspects, the reference signs of the drawings are provided in parentheses for convenience, but the present disclosure is not intended to be limited to the illustrated aspects.

A projection device (1) according to one aspect (first aspect) includes a display panel (10) including a plurality of light emitting elements (130) that emit light in a predetermined direction, and an optical path shift element (20) that shifts an optical path of light emitted from the plurality of light emitting elements (130), in which the display panel (20) emits light in accordance with the shift of the optical path.

According to the first aspect, light is emitted in accordance with the shift of the optical path, and thus inconsistency of display does not occur.

The projection device (1) according to a specific second aspect of the first aspect includes a video processing circuit (40) that supplies video data to the display panel (10) and outputs a control signal to the optical path shift element (20), and the video processing circuit (40) causes the display panel (10) to turn on the plurality of light emitting elements (130) in a first period (for example, L_f1), to turn off the plurality of light emitting elements (130) in a second period (Vblnk) after the first period (L_f1), and to turn on the plurality of light emitting elements (130) in a third period (L_f2) after the second period (Vblnk), and causes the optical path shift element (20) to fix the optical path in the first period (L_f1) and the third period (L_f2) and to shift the optical path in the second period (Vblnk).

Note that a light emission sub-frame L_f1 is an example of a first period, a vertical scanning blanking period Vblnk is an example of a second period, and a light emission sub-frame L_f2 is an example of a third period.

In the projection device (1) according to a specific third aspect of the second aspect, when a pitch between projection pixels visually recognized when the optical path is fixed is p, a shift amount of the optical path in the second period (Vblnk) is k+(p/2), where k is an integer of 0 or more.

According to the third aspect, it is possible to increase a pseudo resolution by the projection pixels visually recognized in the first period (Lf_1) and the third period (Lf_3).

In the projection device (1) according to a specific fourth aspect of the third aspect, the display panel (10) includes a panel pixel constituted by sub-panel pixels that emit red, green, and blue light, respectively, and the pitch between the projection pixels corresponds to a pitch between centers of gravity of the panel pixels.

In the projection device (1) according to a specific fifth aspect of the second aspect, the optical path shift element (20) shifts an optical path of combined light of the plurality of sub-panel pixels, a pitch between projection pixels visually recognized when the optical path is fixed is p, and when a maximum diameter of the projection pixel is w, a shift amount of the optical path in the second period (Vblnk) is k+(p/2), where k is an integer of 0 or more, and w<p/2.

According to the fifth aspect, it is possible to increase a pseudo resolution by the projection pixels visually recognized in the first period (Lf_1) and the third period (Lf_3) while avoiding the projection pixels overlapping each other before and after the shift.

The projection device (1) according to the first aspect can be conceptualized as a sixth aspect of a method of controlling the projection device (1). In detail, the method of controlling the projection device (1) according to the sixth aspect is a method of controlling a projection device including a display panel (10) including a plurality of light emitting elements (130) that emit light in a predetermined direction, and an optical path shift element (20) that shifts an optical path of light emitted from the plurality of light emitting elements (130), the method including causing the display panel (10) to turn on the plurality of light emitting elements (130) and causing the optical path shift element (20) to fix the optical path in a first period (Lf_1), causing the display panel (10) to turn off the plurality of light emitting elements (130) and causing the optical path shift element (20) to shift the optical path in a second period (Vblnk) after the first period (Lf_1), and causing the display panel (10) to turn on the plurality of light emitting elements (130) and causing the optical path shift element (20) to fix the optical path in a third period (Lf_2) after the second period (Vblnk).

According to the sixth aspect, since the optical path is fixed in the first period (L_f1) and the third period (L_f2) in which the light emitting elements (130) are turned on, and the optical path is shifted in the second period (Vblnk) in which the light emitting elements (130) are turned off, and thus inconsistency of display does not occur.

What is claimed is:

1. A projection device comprising:
 a display panel including a plurality of light emitting elements configured to emit light;
 an optical path shift element configured to shift an optical path of light emitted from the plurality of light emitting elements; and
 a video processing circuit configured to supply video data to the display panel and output a control signal to the optical path shift element, wherein the display panel emits light in accordance with the shift of the optical path;
 the video processing circuit causes the display panel to:

turn on the plurality of light emitting elements in a first period;
turn off the plurality of light emitting elements in a second period;
turn off the plurality of light emitting elements in a second period after the first period; and
turn on the plurality of light emitting elements in a third period after the second period, and
the video processing circuit causes the optical path shift element to:
fix the optical path in the first period and the third period; and
shift the optical path in the second period.

2. The projection device according to claim 1, wherein, when a pitch between a plurality of projection pixels visually recognized in a case in which the optical path is fixed is p, a shift amount of the optical path in the second period is obtained by $$k+(p/2),$$

where k is an integer of 0 or more.

3. The projection device according to claim 2, wherein
the display panel includes a plurality of panel pixels each including a plurality of sub-panel pixels, each of the plurality of sub-panel pixels being configured to emit red, green, or blue light, and
the pitch between the plurality of projection pixels corresponds to a pitch between centers of gravity of the plurality of panel pixels.

4. The projection device according to claim 1, wherein the optical path shift element is configured to shift an optical path of combined light of the plurality of sub-panel pixels, and when a pitch between a plurality of projection pixels visually recognized in a case in which the optical path is fixed is p, and when a maximum diameter of the plurality of projection pixels is w, a shift amount of the optical path in the second period is obtained by $$k+(p/2),$$

where k is an integer of 0 or more, and $$W<p/2.$$

5. A method of controlling a projection device, the projection device including:
a display panel including a plurality of light emitting elements configured to emit light; and
an optical path shift element configured to shift an optical path of light emitted from the plurality of light emitting elements,
the method comprising:
in a first period,
causing the display panel to turn on the plurality of light emitting elements, and
causing the optical path shift element to fix the optical path;
in a second period after the first period,
causing the display panel to turn off the plurality of light emitting elements, and
causing the optical path shift element to shift the optical path; and
in a third period after the second period,
causing the display panel to turn on the plurality of light emitting elements, and
causing the optical path shift element to fix the optical path.

* * * * *